(12) United States Patent
Todd et al.

(10) Patent No.: US 7,890,612 B2
(45) Date of Patent: Feb. 15, 2011

(54) METHOD AND APPARATUS FOR REGULATING DATA FLOW BETWEEN A COMMUNICATIONS DEVICE AND A NETWORK

(75) Inventors: John Todd, Toronto (CA); Sai Sivanesan, Toronto (CA); David Cann, Toronto (CA)

(73) Assignee: Electro Guard Corp., Toronto (CA)

( * ) Notice: Subject to any disclaimer, the term of this patent is extended or adjusted under 35 U.S.C. 154(b) by 953 days.

(21) Appl. No.: 11/745,068

(22) Filed: May 7, 2007

(65) Prior Publication Data

US 2007/0261112 A1    Nov. 8, 2007

Related U.S. Application Data

(60) Provisional application No. 60/798,339, filed on May 8, 2006, provisional application No. 60/829,157, filed on Oct. 12, 2006.

(51) Int. Cl.
*G06F 13/00*    (2006.01)

(52) U.S. Cl. ...................................... 709/220

(58) Field of Classification Search .................. 709/220
See application file for complete search history.

(56) References Cited

U.S. PATENT DOCUMENTS

| | | | |
|---|---|---|---|
| 6,795,918 | B1 | 9/2004 | Trolan |
| 7,023,861 | B2 | 4/2006 | Makinson et al. |
| 2004/0268147 | A1 | 12/2004 | Wiederin et al. |

*Primary Examiner*—Robert B Harrell
(74) *Attorney, Agent, or Firm*—Brown & Michaels, PC

(57) ABSTRACT

A network security device which acts as an "airlock" for traffic between a communications device and a network. Data is screened using rules based analysis by the security device to counter various threats, including viruses, phishing, attempts to "hijack" communications, communications with known malicious addresses or unknown addresses, and transmission of sensitive information. Data packets can be reassembled into files for screening, and decoded or expanded as necessary, but is never executed. The data path for the data being screened is kept separate from the operations of the network security device itself, so that the device is incorruptible—its programming cannot be compromised from outside sources. Updates for rules and entry of sensitive data for screening, etc., must be done through a physical interface, not via the normal data communications channel. The device is invisible—it cannot be "seen" by the network, and thus cannot be attacked.

68 Claims, 16 Drawing Sheets

METHOD AND APPARATUS FOR REGULATING DATA FLOW BETWEEN A COMMUNICATIONS DEVICE AND A NETWORK

REFERENCE TO RELATED APPLICATIONS

This application claims one or more inventions which were disclosed in Provisional Application No. 60/798,339, filed May 8, 2006, entitled "Network Security Device", and also Provisional Application No. 60/829,157, entitled "Network Security Device", filed Oct. 12, 2006. The benefit under 35 USC §119(e) of the two United States provisional applications is hereby claimed, and the aforementioned applications are hereby incorporated herein by reference.

BACKGROUND OF THE INVENTION

1. Field of the Invention

The invention relates to the general field of data security, and more specifically relates to a network security device that regulates the flow of data to and from a communication device.

2. Description of Related Art

Reference is made to FIG. 4 where the components of a prior art network system are shown. Network systems are generally comprised of one or more communication devices 12, a communication network 16, and one or more server computers 18. The communication devices 12 may be any type of computing device that is connected to a communication network 16. Examples of communication devices 12 may include, but are not limited to, personal computers, laptops, slim line computers, wireless communication devices, data terminals and any other device that is capable of transmitting data to a network.

The communication network 16 that is described herein, generally refers to the Internet, but could be any network which allows for terminals to be connected through any other suitable wired or wireless means for the exchange of data.

A server 18 is any server-type computer that has functionality that allows for a network connection, for example a web server on the Internet. A web server receives requests and processes requests for information to be accessed via hypertext transfer protocol (http) over the Internet.

For example purposes, using the Internet as the exemplar of a network, each communication device 12 and server 18 has associated with it an Internet Protocol (IP) address 20, shown on the figure as four numbers separated by periods (i.e. 64.233.187.99). Computers using the Internet access one or more Domain Name Servers (DNS) 10 to translate a domain name 21 (for example, bpmlegal.com) into a corresponding internet protocol (IP) address 22 for the server 18 hosting the domain (for example, 205.232.34.21). The interaction of the invention with Domain Name Servers 10 will be described in more detail below.

The term "data object" 14 is used to refer to any stream of data that originates from a communication device 12 and is destined for a destination address at a server 18 or other communication device 12. The data object may take various types of message formats including, but not limited to, any combination of cells, packets, and frames. The data objects 14 will vary in length and content depending on the particular application they were created by, and the address to which they are destined. The data object 14 may be transmitted in multiple parts, and the term data object is used to represent a group or block of data of varying size that is to be sent to one common destination address.

With the ever increasing proliferation of communication devices, along with methods to access the Internet, a growing number of people make use of the Internet on a daily basis. Recent statistics indicate that close to 900,000,000 people have Internet access in 2006. According to some estimates, this represents a 146% increase from 2000. Along with an increase in Internet usage, has come an increase in opportunities for fraud to be committed by exploiting people's use of the Internet.

People now rely on the Internet to conduct financial transactions, including banking and purchases of goods and services. In such transactions, sensitive information is often provided by the users. Other forms of sensitive information is often transmitted across the Internet as well, and may include personal information that people wish to keep private (i.e. social security number, passwords, account numbers and other personal data) for fear of it being used by unauthorized parties. As a greater number of people make use of the Internet, the potential for data being sent to, or intercepted by, unauthorized individuals who then use the data for malicious purposes is increasing.

A great deal of research and development effort has been focused on how to prevent unauthorized third parties from accessing sensitive information. As a result, encryption techniques have been developed, along with firewalls that are designed to ensure that only specified users access certain information. However, such methods do not take into account that information is often transmitted in unencrypted forms, and this information may contain sensitive information that is personal to the user that should be kept private. Also, as firewalls are implemented as software solutions, they are vulnerable to hacking.

From the perspective of corporate and personal finances, the last few decades have seen a metamorphosis from traditional banking methods, to nearly instantaneous electronic transactions. Bank branches have become inter-connected; overhead is reduced dramatically when systems that used to exist on mainframes and isolated machines are moved to network environments. With this increased connectivity, the financial abilities of businesses are rapidly changing, in some ways exponentially.

At the same time, corporations have incorporated evolving network technologies into their day-to-day affairs, linking satellite offices and branches into a centrally served, always on interconnected structure. This has allowed unprecedented levels of growth, information sharing, and business efficiency. Billions of paper documents have been put online, made searchable, and integrated into the corporate network. Email has become absolutely essential as a mode of communication at every level of a company's dealings.

With every additional step toward interconnectivity, however, the theoretical possibility of a security breach, an instance of identity theft, or direct monetary loss increases. As companies connect their branches together through the Internet, malicious web users are able to attack through numerous new vectors. These problems affect both companies and home users, truly anyone who has entered a piece of sensitive financial, or corporate information on their Internet-enabled computer, is at risk. The basic modern network is depicted in FIG. 4.

One of the most successful forms of attack is the scamming technique known as "phishing", where information is stolen from a computer user through a complex act of deception. A report issued in May 2006 by Gartner Research estimated that between the banks and credit card issuers, $1.2 billion in damage was wrought on the US financial market alone, due solely to phishing scams. The rate and severity of these attacks is increasing at an exponential rate, as security holes are discovered and financial institutions scramble to protect their procedures.

Phishing can be seen as an prime example for social engineering toward a malicious goal. The concept is simple; the user is presented with an email or some sort of message, claiming to be from a financial institution. The message appears completely legitimate, using the company's logo or letterhead, and presenting a largely believable scenario to the user. Perhaps there has been a transaction problem, or the user is being asked to update their personal information. Upon clicking the link within the message, the user is presented with a website seemingly set up by the financial institution; indeed, it is identical in some instances, even with the same address in the browser's address bar. The website is owned, of course, by the malicious user, and is intended to trick the victim into entering their sensitive details, which are then sent directly to the attacker. This technique is unfortunately wildly successful.

Phishing is not the only form of attack that users must be wary of. Since corporations first began storing sensitive documents on their networks, attackers have been interested in stealing these secrets. Through complex methods used to "crack" a server, perhaps through a bug in the code, or an exploitable security hole, attackers are frequently able to gain access to a corporation's entire network, where they are free to delete files at will, or run destructive code. Worse, theft is becoming increasingly common, and the Internet is growing as one of the most powerful vectors for corporate espionage. The cost of such espionage can often be devastating.

Network firewalls as well as anti-viruses are limited because they can only detect known viruses or worms that have already been identified (usually after they have already attacked many computers). Network firewalls are based on packet filtering, which is limited in principle, since the rules of which packets to accept or not may contain for example subjective decisions based on trusting certain sites or certain applications. Once security is breached for any reason, for example due to an error or intended deception, a hostile application may take over the computer or server or the entire network and create unlimited damages (directly or by opening the door to additional malicious applications). They are also not effective against security holes for example in browsers or e-mail programs or in the operating system itself. According to many experts, security holes in critical applications are discovered so often that just keeping up with all the patches is impractical. Without proper generic protection for example against Trojan horses, which can identify any malicious program without prior knowledge about it, even VPNs and other forms of data encryption, including digital signatures, are not really safe because the information can be stolen before or below the encryption.

Another disturbing development in the field of computer viruses has been the creation of Trojan-proxy viruses. These viruses are transmitted in much the same way as typical infections, through email and illicit websites. They are often undetectable for a period after their creation, as is normally the case with viruses; this lag period is when security companies scramble to identify and remove the malicious code, and the removal tools are issued to their users in the form of a security update. Update diligence varies widely from company to company, and the period of time between a virus's inception and the application of the corresponding update can be anywhere from a few hours, to months. Anti Virus software, such as Norton or MacAfee, are by their nature reactive and their effectiveness is subject to the scanning schedules of the user, the availability of suitable anti-virus software updates and the users schedule to update this software. As well, firewall software is relatively superficial, and especially at the individual user level is not effective against many virus access routes such as e-mail and browser based transmissions.

A proxy server, by itself, is typically considered a tool of defense. Proxy servers essentially sit somewhere between a workstation or local network, and the rest of the Internet, translating and directing the traffic that they receive. This extra translation step serves to obfuscate the original sender of the data, because by the time the data reach the Internet, the "source" computer is the proxy server, not the original sender. Servers on the Internet then respond by sending data back to the proxy server, which re-translates the information and sends it back to the original workstation that made the request in the first place. In this sense the proxy server acts much like a router, but with a geographical advantage; the proxy server can be anywhere in the world, with an IP address completely unrelated to the local workstations or networks using the server.

For the security conscious, many proxy servers have been set up which do not require any sort of membership or personally identifiable information. These "anonymous" proxy servers accept connections from networks or workstations and perform the typical translations to hide the identity of the original sender, but their anonymous nature means that not even the owner of the proxy server knows who is using their services. Unfortunately, this is a very attractive prospect to virus senders, malicious hackers, and other unsavory types. Often multiple anonymous proxy servers are chained together, forwarding data from one to the other, making it nearly impossible to ascertain the original source of a virus or malicious command.

A Trojan-proxy virus, when it infects a user's computer, turns it into a private and anonymous proxy server without the owner's knowledge. From then on, the virus creator can use the computer as a staging point for attacks or further virus transmissions, with near impunity. One of the more worrying aspects of this scenario is the chance that a common user can be mistaken for a suspect during an investigation into electronic crime, since their computer may have been used (without their knowledge) as a proxy server for the actual attacker. This fact, not to mention the enormous toll taken on local bandwidth and system resources, is enough to highlight the potential danger of a Trojan-proxy infection.

As previously outlined, traditionally, the most effective protection against Trojan-proxy infections has been the use of a well-maintained virus scanner, and a properly installed firewall. The firewall would conceivably restrict the virus's pathways to the Internet, assuming it was using an uncommon port to make those connections; alternatively, the more comprehensive firewalls would recognize abnormal traffic patterns and either block them, or at least inform the user. This would typically provide a basic level of protection until a virus scanner update could be installed and the infection removed properly.

The mounting threat of phishing scams and information theft has not escaped the purview of some of the largest security firms, and Microsoft has deemed fit to include a brand new anti-phishing component within its next generation web browser, IE7. The technology relies on a number of key assumptions, and uses a series of basic analyses to determine if a site is malicious. The limitations of IE7 in detecting phishing scams are unfortunately prominent, and arise both from insufficient programming and an intrinsic inability for a software program to completely protect a system.

One of the primary methods IE7 uses to detect a malicious website is a client-side whitelist of "safe" websites which is transmitted incrementally from the central Microsoft server. The client computer appears to connect periodically to Microsoft in order to automatically update its whitelist, but the frequency of these updates or the manner in which the information is passed to the client computer, is currently known only to Microsoft. Logistically, this approach is largely trivial, as any meaningful whitelist would have to be enormous and constantly maintained as servers change and addresses migrate. Presumably the client-side list would be stored in some sort of encrypted archive, but the very idea that the database of safe sites is stored on the user's computer, means it is intrinsically vulnerable to modification. If a virus can crack the archive and insert false whitelisted addresses, the futility of such a measure is put into sharp relief.

Beyond the simple whitelist, IE7 attempts to perform a heuristic analysis on every site a user visits not on the whitelist. This heuristic analysis examines a site for clues indicative of a phishing scam, and upon detecting what it deems a positive result, sends the address in question to the Microsoft central server for further analysis. This behavior is the default, unfortunately, and does not bode well for legitimate site owners whose websites throw a false positive when examined by IE7. The most glaring fault, however, is the apparent ease in which one can submit a site to Microsoft for inclusion into the whitelist; it's apparently as simple as filling in a form. The process would presumably be somewhat automated, as the staff needed to manually examine every single whitelist submission would be staggering. This harks back to the problem inherent with security certificates; if the malicious user can obtain authentication, what good is the authentication process?

Firewalls, Intrusion Detection and Prevention Systems, as well as virus scanners and removal tools have typically existed as software installed on the end-user's computer, or as dedicated network nodes.

In the case of software, a myriad of problems exist which often compromise the objectivity of the security system; virus scanners must work within the confines of the operating system, and thus can be circumvented by new viruses, while firewalls can be bypassed through clever execution of malicious code. In short, no security software which runs on the same system it is attempting to protect, can ever be completely safe. Worse, with new rootkit viruses being developed at an accelerating rate, it is becoming more difficult to even detect whether or not a system has been compromised.

Dedicated network nodes overcome some of these problems, but face additional shortcomings due to their implementation. Network security nodes are typically accessed remotely (from elsewhere on the local network) through a website interface, or similar front-end which requires the node to have an IP address. Once the node has an address, it is completely visible on the network and can theoretically be attacked. Once the possibility for attack exists, the security of the node, and thus the security of the network itself is contingent on the ability of the network administrator to patch every hole and monitor every exploitable bug in order to keep intruders out of a system.

US published patent application 2004/0268147, "Integrated security system", aims to use a variety of methods to examine the data payload of traffic for so-called "malicious content". However, the invention does not appear to function invisibly on the network, and is thus vulnerable to attack. Beyond this, the above-described invention appears concerned exclusively with data originating on the external network and passing into the client node, rather than dealing with data bi-directionally.

U.S. Pat. No. 6,795,918, "Service level computer security" is essentially a less-complex and non-configurable fire-wall. The market is home/small office users who don't need the features of a full fledged firewall. The invention intercepts traffic packets, and works primarily with protocol, source port, and destination port data. There is no interface through which a user can configure the rules or the logic of the invention. The data analyzed by the "packet analyzer" segment of the invention is strictly from the packet headers, and not the information payload.

U.S. Pat. No. 7,023,861, "Malware scanning using a network bridge", functions as a network bridge with the aim of scanning incoming files for "malware" or otherwise malicious pieces of code. It concatenates incoming data files from their individual packets, examines the data file, and either drops or passes the file to the client computer. Furthermore, the invention can examine packets to determine which ones to inspect. The invention operates unidirectionally (scanning incoming traffic).

Statutory Invention Registration (SIR) H1944, "Firewall security method and apparatus", is a driver-based physical "dongle" attached to the parallel port on a client computer. All traffic to the client node must pass through the dongle. The firewall is controlled by device drivers installed on the client computer in the form of DLL files. Since the operating software for the device is run on the same computer as is using the device for communication, the software is subject to attack and subversion. The firewall can be updated through connection to an external server, over the Internet, though it does not rely on this server for normal operation. The firewall can check the contents of packets for such things as viruses and file characteristics, in both directions on the network. The firewall can monitor traffic for "suspected communications which may lead to a security breach", wherein the implied "security breach" is an attack on the client computer, rather than a transmission of unauthorized sensitive information (eg. confidential documents). The device appears to be visible on the network, and makes no claim to work at the MAC level or any claim of functional network invisibility.

SUMMARY OF THE INVENTION

The invention comprises a network security device which acts as an "airlock" for traffic between a communications device (computer, terminal or network) and a network such as the Internet. Data is screened using rules based analysis by the security device to counter various threats, including viruses, phishing, attempts to "hijack" communications, communications with known malicious addresses or unknown addresses, and transmission of sensitive information. Data packets can be reassembled into files for screening, and decoded or expanded as necessary, but is never executed. The data path for the data being screened is kept separate from the operations of the network security device itself, so that the device is incorruptible—its programming cannot be compromised from outside sources. Updates for rules and entry of sensitive data for screening, etc., must be done through a physical interface, not via the normal data communications channel. The device is invisible—it cannot be "seen" by the network, and thus cannot be attacked.

The network security device of the invention may work in cooperation with a secure server, which provides information about threat outbreaks, acts as a source of known good addresses for comparison with DNS results, and provides other functions to be described below.

When a threat is detected, the network security device can notify a local user, the secure server, or a law enforcement agency or financial institution. The security device may substitute decoy or false information for the intercepted communications, in order to facilitate law enforcement efforts.

DETAILED DESCRIPTION OF THE INVENTION

Airlock

Figure 1:
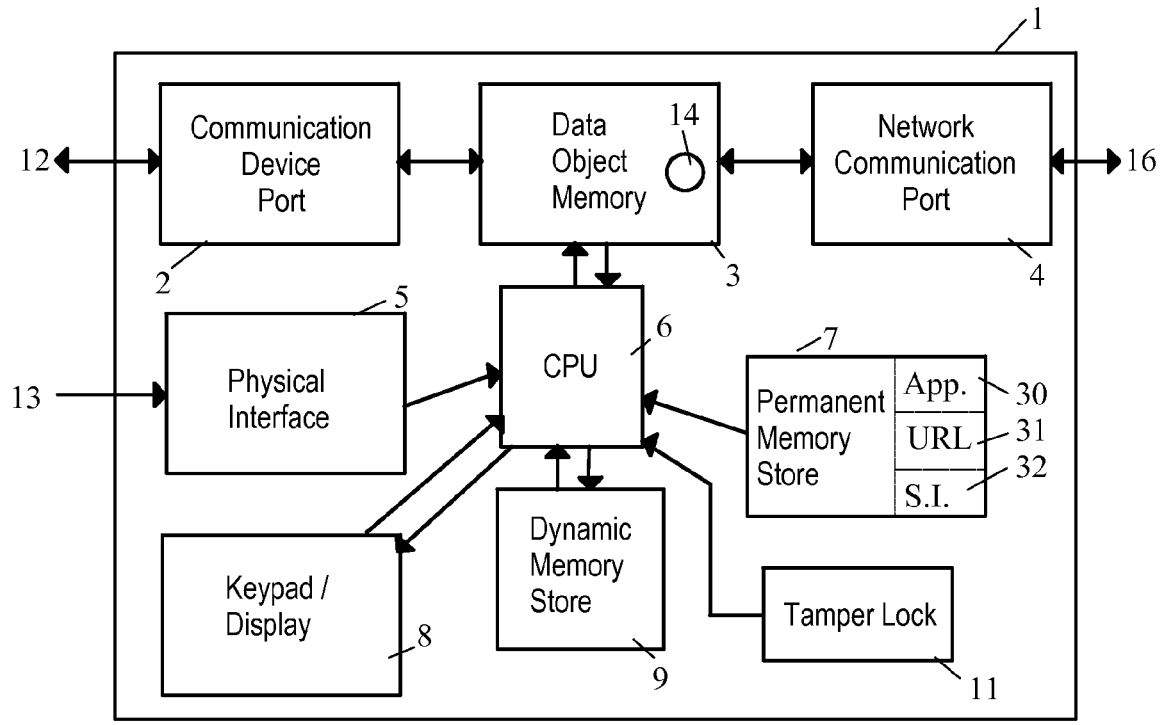
FIG. 1 is a block diagram illustrating the components of an embodiment of a network security device of the invention.

The network security device of the invention shares some attributes with a network bridge, in that it operates at the second-lowest level of the OSI network model (Layer 2, the link layer) and does not require an IP address to communicate on the network. For this reason, it is invisible to network detection and thus immune to attack.

Where it begins to diverge from a network bridge is within its security modules or configuration, which are designed to inspect, modify, mangle, reconstitute, and perform any number of security operations on the packets which pass through the airlock.

The "airlock" analogy stems from the fact that once a packet enters the network security device, it is completely isolated from both the local and external networks, while inspection takes place. Furthermore, the packet is never executed (like normal code is within a computer) and thus has no power to affect the network security device in any way.

Beyond simple packet inspection, the network security device can essentially contact other Network security devices, secure servers, hosts and other approved nodes (both locally and externally), using a secure connection, for guidance or function. This guidance assists the network security device in forming a decision as to the fate of the traffic contained and awaiting transmission within its airlock. Furthermore, the guidance provided by approved external nodes allows the network security device to route the traffic to another node, possibly to a secure server or a law enforcement agency, or to "treat" the data within the airlock before it is allowed to proceed to the secure end of the network security device or other destination.

The use of a network airlock to inspect traffic makes practical sense when protecting against rootkits, Trojan viruses, or other types of "malware". This malware can originate both from the external network, and from within nodes or subnetworks on the "secure" side of the network security device. The seamless security provided by the airlock works comprehensively in both directions, protecting against sensitive information transmission and malicious traffic, no matter where it originates, without any risk of the code being executed or causing harm within the network security device itself.

The network security device accomplishes its many tasks very efficiently, and will be designed and coded from the ground up when it goes to market. For this reason, processing demands are very low, and the network security device could easily run on the same type of solid-state CPU that consumer level routers and firewalls use. All persistent data are stored on flash-based, non-volatile memory modules in the network security device and the processing could be accomplished with a low-clockspeed mass-produced CPU chip, custom programmed with the network security device's security routines. Regarding hardware needs, the network security device does not require any unusually complex components, and thus would not be hampered by exorbitant hardware costs.

Due to the low processing requirements of the network security device, an "in-computer" design could be achieved for certain markets (for example, the consumer version of the network security device). Processing could take place on an internal hardware board, and the network security device could be installed into a PCI or similar slot much the same way as current Ethernet cards. The functions of the network security device security device could also be burned into a custom chip. This would save desk space, increase security (since the network security device could not be bypassed in the same way) and simplify day-to-day interaction with the device. This method has increased security because there is no external cable to worry about. In the normal configuration the cable between the user's computer and the network security device would preferably be physically secured, with an onboard chip this cable is inherently secure since the device performs its function inside the computer.

Overall, the network security device can be designed, manufactured and sold in a number of incantations, depending on the processing needs of the given network, and the functional advantages of a given physical design in various networking environments.

Although it has described herein as a standalone box or internal hardware, it will be recognized by one skilled in the art that one or more of the functions described herein could be implemented in software on the user computer. This software could be provided in the form of read-only memory (ROM) so as to be more tamper-proof.

Unlike a normal bridge, the network security device of the invention has the ability to pass, drop, reject, mangle, or otherwise manipulate any packet passing through it, all in a completely transparent manner. Every single packet manipulation the network security device carries out is completely invisible to both the computers on the local network, and external nodes. This invisibility provides a security platform which is un-hackable; the network security device, for all intents and purposes, does not exist on a network. That which does not exist, cannot be accessed or scanned, and thus cannot be attacked.

System Overview of the Invention

Figure 2:
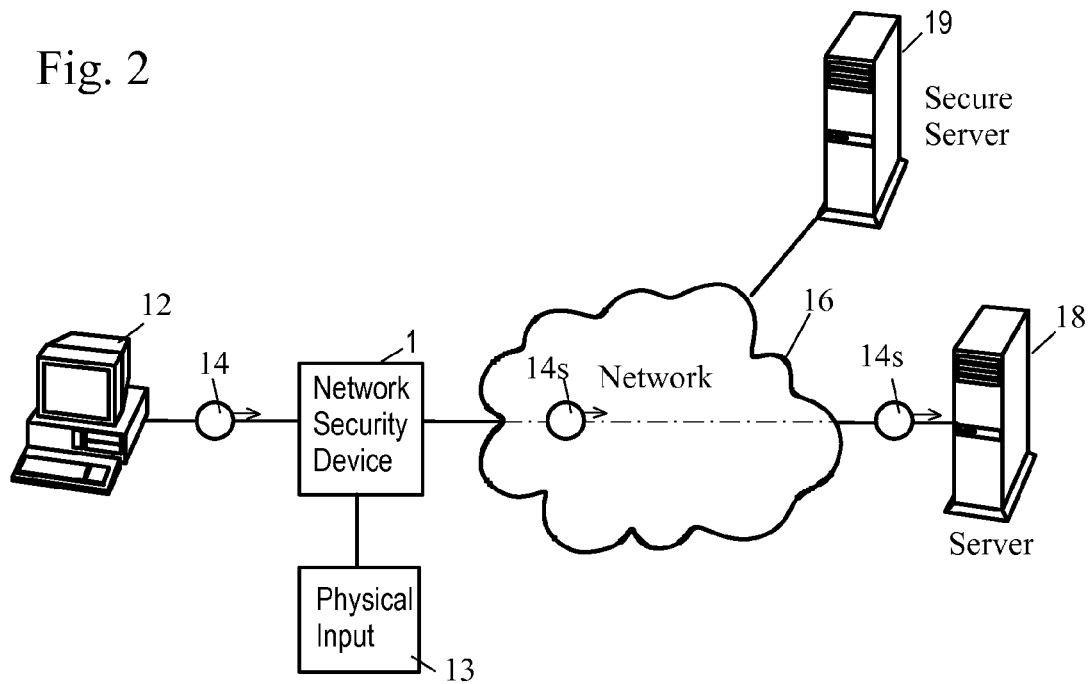
FIG. 2 is a diagram of a computer protected with a network security device of the invention.

Referring to FIG. 2, a network system that embodies one or more network security devices 1 that are the subject of this invention is shown. A communication device 12 is used to generate a data object 14, which is transmitted from the communication device 12 through network 16 to an external computing device, for example server 18. In this explanation, the data objects 14 are described as being destined for web servers, and server 18 is understood to be such a server. However, it should be understood by one skilled in the art that the data objects 14 may be destined for any external computing device.

The data object 14 upon transmission from the communication device 12, is transmitted directly to a network security device 1. The network security device 1 is used to analyze and filter data objects 14 that are sent to or from a communication device 12. The network security device 1, which will be described in further detail below, determines whether a data object 14 may be transmitted to its intended destination address based on a set of rules. It is preferred that the network security device 1, while being inserted in the communications path between the communications device 12 and the network 16, not itself be accessible or addressable from either—this is referred to herein as "invisible".

That said, it should be noted that the network security device is technically accessible in limited circumstances, but only by such allowed devices as the secure server 19 and other network security devices 1, and when physically permitted via the physical interface 5, or tamper lock 11 or keypad/display 8 or the like. Specifically, if the network security device 1 is talking over the Internet 16 to the secure server 19, there would need to be a "window of opportunity" or physical method of initiating and controlling the connection, whereas if two network security devices 1 want to propagate firewall rules to each other, on the same local network, this can happen automatically.

The rules as are explained in further detail below, may be specified by a user of the communication device 12, or may come embedded in the network security device 1 or may be supplied by a secure server 19 as is explained below.

The secure server 19 may be used to perform DNS queries, along with interfacing with security and law enforcement agencies. The secure server 19 may also be used to update the security devices 1 with respect to any information pertinent to the security of a network system. If it is determined by the rules that are associated with the network security device 1 that the data object may proceed to its destination address—server 18—a screened data object 14s is transmitted to the respective destination address. The screened data object 14s differs from the data object 14 that was received by the network security device in that it has been analyzed with respect to its contents and or its destination address.

Reference is now made to FIG. 1, where the components of the network security device 1 are shown in one exemplary embodiment. The network security device could be a free-standing "box", as shown, or could be configured as a board designed to mount internally in a computer or other communication device. When implementing the network security device 1 as an internal circuit board, the security device 1 is preferably designed such that removal of the device from the motherboard or communication system renders the communication devices 12 to network connection 16 capability inoperable.

The device 1 has a central processing unit (CPU) 6, which can be any processor as might be available at the time, for example an Intel Pentium® or AMD Athlon® chipset, or equivalent. The central processing unit 62 is a dedicated processor that is used to execute instructions and commands that are used to control the operation of the network security device 1. The CPU 6, as is known to the art, uses a dynamic memory store 9 of random-access-memory (RAM) for storing processing results, locally entered information (for example, sensitive information for which the device is screening data), and operating memory locations.

The dynamic memory can be any sort of read/write memory including solid-state memory or disk storage. The CPU also uses a permanent memory store 7, which is used for storing the programming instructions and rules utilized in the device 1.

The permanent memory store may be integrated with the dynamic memory 9 in RAM or disk memory, in which case it would preferably be kept inviolate through software or firmware security means. Preferably, the permanent memory store 7 would be kept in Read-Only-Memory (ROM), including solid-state ROM or CD-ROM or DVD-ROM, or could be in erasable and programmable Read-Only-Memory (EPROM). Alternatively, the permanent memory store 7 could be configured as a number of physically separate memory devices—for example, when it is desirable to completely secure a section of programming, it could be burned to a ROM, whereas a list of URLs, which might need to be changed, could be kept in EPROM or on a plug-in chip or CD which could be physically changed as needed. However the permanent memory store is physically configured, it is preferable that the programming and rules cannot be changed by any external threat, referred to herein as "incorruptible", as will be described in more detail below.

The permanent memory store 7 might store, for example, a security application 30, a URL database 31, and a sensitive information database 32. The security application 30 is a software application that is used to control the processing and rules system. The URL database 31 is used to record a list of URLs or IP addresses to which data objects 14 may (or may not) be transmitted, or from which they might (or might not) be received. The sensitive information database 32 is used to record sensitive data that should not be transmitted as part of any data object 14.

The URL database 31 may have the list of URLs and/or IP addresses populated through a combination of different methods. A basic database may be supplied on ROM when the network security device is first provided. A list of URLs that make up the URL database may be input by an administrator, or the list of URLs may be entered by the user when the network security device 1 is being used for the first time. The list of URLs may also be added to by the user at any point. Also, the list of restricted URLs may be updated through internet updates that may originate from a secure server 19. The update from the secure server 19 could take place after specific URLs have been classified as allowed on the secure server 19, which would then update the database on the network security device 1. The URL database may contain a list of allowed URLs ("white list"), and disallowed URLs ("black list"). A user-editable black list prevents the transmission of any data objects 14 to certain marked URLs or IP addresses, and, conversely, a user-editable white list would allow unrestricted communication with certain marked URLs or IP addresses. It will be understood that while the terms "URL" and "IP address" used in these examples are Internet-specific terms, the principle of the invention embodied in the processing described in terms of URLs and IP addresses could be used with any addressing scheme applicable to any networking protocol now in use or to be developed in the future.

Examples of sensitive information in the sensitive information database 32 include, but are not limited to, social security numbers, credit card numbers, bank account numbers, brokerage account numbers, specific passwords, brokerage codes, and any other type of information that may be used for malicious purposes. The list of sensitive information contained within the database 32 may be entered by the user based on an initialization method that is carried out and as is described in further detail below.

The user is able to update the URL database 31 and the sensitive information database 32 at any time. In alternative embodiments, the URL database 31 and the sensitive information database 32 may be updated by a physical memory device 13 coupled to the physical interface 5, which may have stored upon it the updates that are necessary to both databases. Such memory devices that are used for the updates may be provided by a trusted authority and/or the manufacturer of the network device 1. The updates that are provided on the physical memory devices are preferably encrypted, and are decrypted upon interfacing with the security device 1. Updates that are provided to the security device 1 are also authenticated as being from a trusted entity.

In an exemplary embodiment, any updates that are provided to the security device 1 are encrypted using private key encryption. The updates sent to the security device 1 are then decrypted. If decryption is successful a check sum verification is applied. The check sum verification method is used based on the serial number of other embedded code associated with the security device 1. It will be understood that other methods of data verification could also be used, such as hashing routines, public-private key encryption matching, etc.

The network security device of the invention has at least one communication device port 2, which communicates with communication device(s) 12. Depending on the application, a plurality of communications ports 2 could be provided, possibly connected by an internal or external router, hub or switch, to allow more than one communication device 12 to connect to a single network communication device 1. This port could use any desired communication arrangement, depending upon the needs of the network and the current technology. For example, the port could be an Ethernet port, or a serial, parallel or USB port, or an 802.11 or Bluetooth wireless connection, an infrared transceiver, or any other appropriate connection as might be developed in the future.

The network security device also has a network communication port 4 for connection with network 16. In many cases this port will utilize the same technology as used in the communication device port 2, so that the network security device may be inserted seamlessly and invisibly into a communication path between the communication device 12 and the network 16.

The communication device port 2 and network communication port 4 may be physically secured—as an example, tamper proof screws may be used to prevent the removal of cables, or a locking shield may be used to prevent the tab on plugs from being pressed to release the cable from the port 2 or 4. The network cable may also contain an electromagnetic lock that is activated with unused pairs in the cable. In alternative embodiments, the connection may be electronically monitored. The electronic monitoring may be accomplished by fitting a network security device an alarm mechanism (not shown) which would warn of a disconnected cable, so that disconnecting the cable from the communication port 2 or network port 4 would set off an audible or visible alarm, or send a message to a security supervisor.

Data objects passing between the communication port 2 and the network port 4 are stored, at least temporarily, in data object memory 3, which acts in the nature of an "airlock", isolating the data objects for packet reassembly and analysis, as will be explained in detail below. The data object memory 3 is preferably kept separate from the dynamic memory 9 and permanent memory 7 of the CPU 6, so that data objects passing through the device cannot affect the programming of the device.

The network security device 1 preferably is equipped with a physical interface 5 and, preferably, keyboard/display 8, which are separate, logically and physically, from the communications device port 2 and the network port 4. The display could be any sort of display known to the art, from simple labeled lights through one- or two-line 40-character LCD readouts, to full-scale monochrome or color displays as might be used on a laptop computer or PDA. Similarly, the "keyboard" might be a full alphabetic keyboard, or just a limited number of switches, or a thumbwheel that is used to scroll among the selections that are displayed on the display.

This physical interface in an exemplary embodiment, is a physical port to which physical input 13 is connected—this might be a USB or serial or parallel interface for local connection of a programming terminal or "thumb drive", or a PCM/CIA socket for a ROM cartridge, or a wireless connection or other source of data. In any case, the physical interface 5 is preferably (a) separate from the data path being analyzed, and (b) requires physical presence at or near the device. The physical interface 5 and keyboard/display can be used to enter or modify rules and sensitive information, etc., as will be described in greater detail below. By requiring physical presence at the device 1, the probability of a remote attacker being able to change or access the internal data and rules in the device 1 is greatly reduced.

Each physical device 13 may be keyed to be used with one security device 1 by assigning a unique key to the device 13. The security device 52 is in possession of the unique key that allows the interface device 78 to interact with it. When an attempt is made to interact the interface device 78 and the security device 52, the security device ensures that the correct key information is provided by the interface device 78.

The network security device may be equipped with a tamper lock 11, to provide the user with a manual override option where the network security device has classified certain data objects 14 as being unsuitable for transmission. When the network security device 1 has determined that a data object may not be suitable for transmission, the data object 14 is not transmitted to the destination address and the user is notified that the data has not been transmitted. Upon the user receiving notification of the data object 14 not having been transmitted, the user has the option of activating a tamper lock 11 that then allows for the data object to be transmitted to its destination address 20. The tamper lock 11 may be implemented as, but is not restricted to a key lock, a biometric lock, MAG card lock, and a USB dongle lock. The tamper lock 11 may also be used to increase the security of the system by requiring a user who wishes to use a physical device 13 plugged into the physical interface to engage the tamper lock 11 to allow for such an interface to take place. This would prevent unauthorized users from being able to make use of any input mechanisms that may be associated with such a device.

Multiple users may be associated with one security device 1 by having their own profile stored upon the device with respect to sensitive information and white-list and black-list URLs. When multiple users are associated with a security device 1, an authentication method would preferably be provided, so that the security device 52 is able to differentiate between the users that are using the security device to update/create their respective profiles.

The security device 1 may also have associated with it a master key. The master key allows authorized users to interact with the security device 1. The master key is checked when the user provides authentication information when interacting with the security device. In the example provided above, where a physical device 13 is used to interface with the physical interface 5, the master key may be the unique key associated with the network security device 1. Alternatively, the master key may be derived from authentication that is required when a user wishes to interact with the security device 1. In one embodiment, the authentication may be a combination of one or more of a biometric authentication and password entry. Those users that possess a master key are able to administer the operation and configuration of the security device 1.

Other users of the security device 1 might have subordinate keys. The holders of subordinate keys might then be restricted in the extent to which they are permitted to configure the security device 1 with regards to any feature. For example, holders of such subordinate keys might be restricted so that they can only configure options which are associated and allowed within their profile.

In a preferred embodiment, upon connecting the network security device 1 with a communication device 12 through port 2, the MAC (media access controller) address is registered with the network security device 1 and stored in the dynamic memory store 9. Upon disconnecting the communication device 12, the network security device 1 may generate an alarm signal that may be silent or audible. The alarm signal is used to indicate that communication device 12 is no longer connected to the network security device 1.

Hardware and Software Architecture and Configuration

The network security device is designed to be a self-sufficient, automated security appliance, and as a result the final form factor can be any of multiple designs. For corporate infrastructures the network security device hardware can be built into a rack-mountable, standard-size security appliance, and mounted the same way a firewall or web server may be mounted.

At the consumer level, the network security device is most likely an add-on standalone device (similar to the prototype) with a clean, intuitive design. It sits on a desk the same way a router or printer might, but with a smaller footprint. The LCD screen and input keypad fold away when not in use, and when folded away the device is roughly the size of a consumer-level router or hub. During regular usage, status LEDs indicate if the device is functioning normally, or if an attack has been detected, prompting further action by the user.

Figure 3:
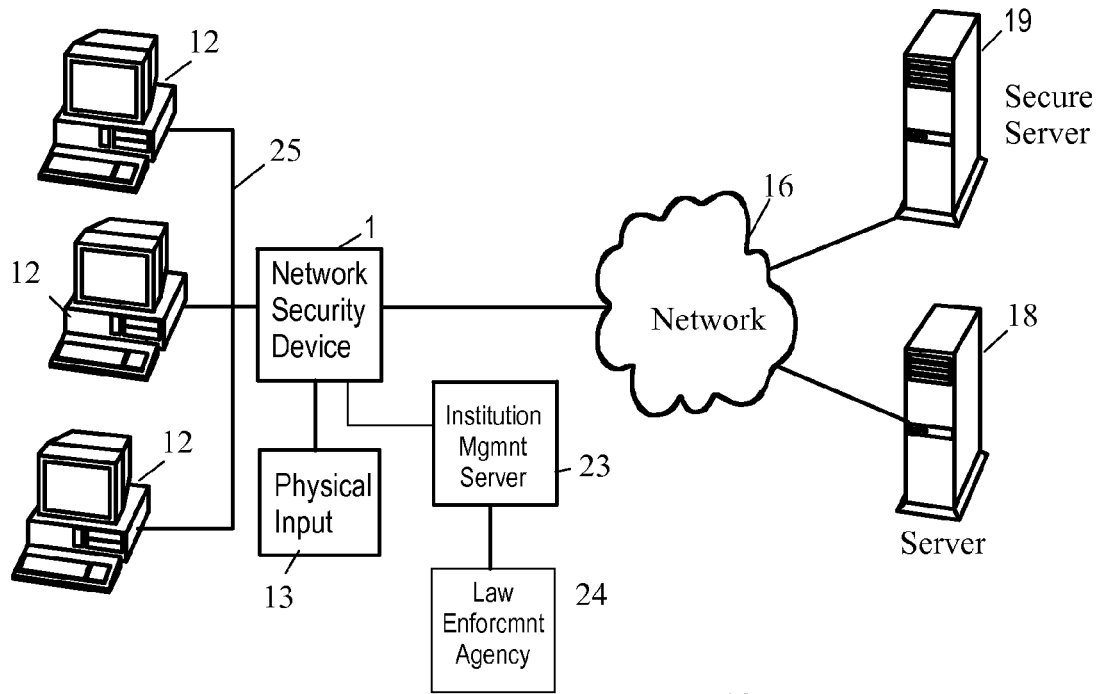
FIG. 3 is a diagram of a network protected by a network security device of the invention.
Figure 4:
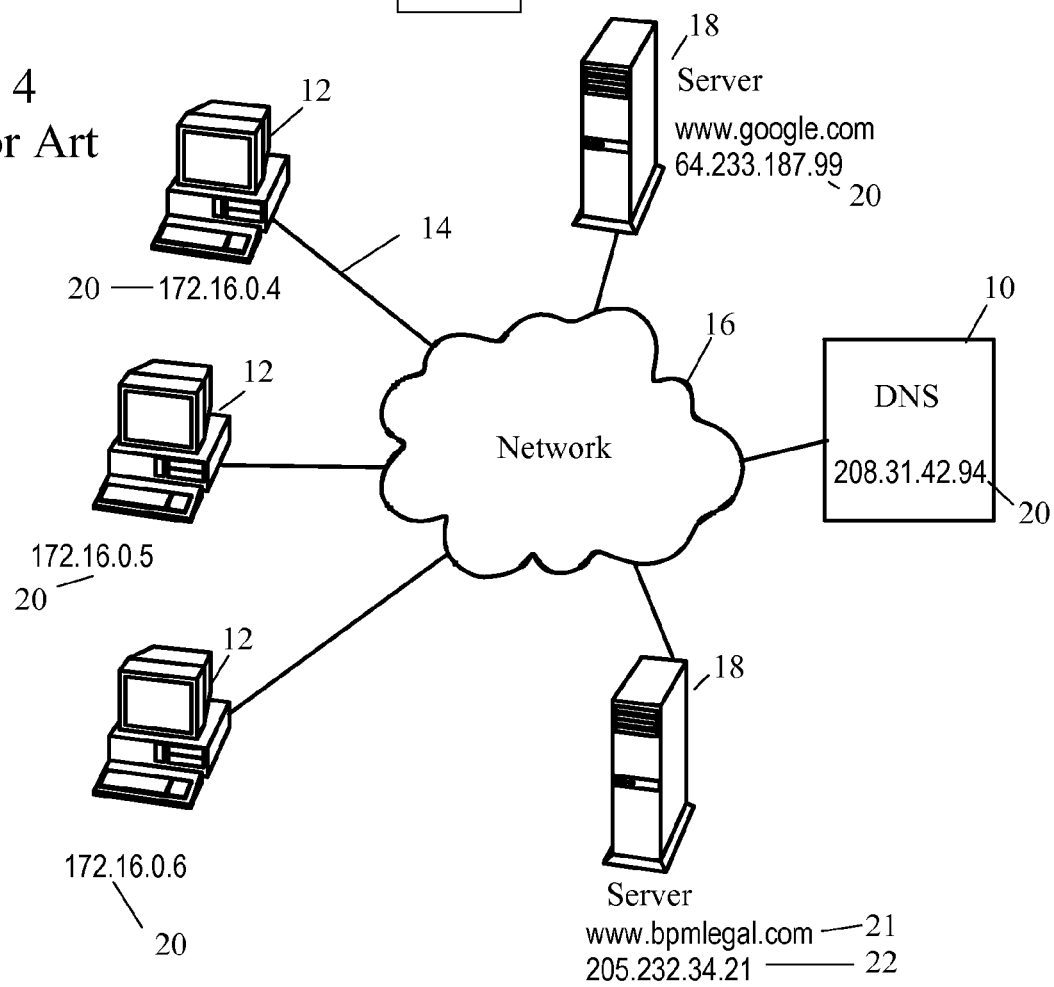
FIG. 4 is a block diagram of a basic network of the prior art.

The network security device 1 is plugged into the user's computer network so that it sits between the local computer 12, and the Internet 16. In a corporate network, as shown in FIG. 3, the network security device 1 can be inserted at the "exit point" of the network, the point at which it joins the Internet 16. In this configuration, all data sent from the local network 25 (or single computer 12) to the Internet 16 has to pass through the network security device 1. It essentially acts like as a gate; it is invisible to both the local network 12 and the Internet 16 (it doesn't show up in a network trace) and performs its job silently. If a company is interested in a zone-based security approach, Network security device devices can be configured and inserted between network segments to provide additional levels of security, protecting information from leaking between departments or even individual computers.

Incoming Communications

Much of the previous discussion has centered on Network security device's ability to protect and filter outgoing data to protect sensitive and restricted data. The present section concentrates on the applications and potential of Network security device with respect to aspects of incoming data as well as larger network and VPN security The network security device's ability to analyze and manage network traffic on the most basic level, the packet level, allows it to be employed for a variety of security tasks. In addition to comprehensively examining outgoing traffic for sensitive information, and safeguarding against phishing and virus activity, the network security device can be used effectively to protect against a variety of incoming attacks. Similarly, the network security device's sophisticated analysis tools can be programmed to recognize potentially dangerous or otherwise notable content, ranging from incoming Spam and virus traffic, to copyrighted content entering a protected network without proper authorization. A number of examples pertaining to incoming traffic will be detailed here, although with the robust and customizable nature of the network security device, the applications are limitless.

The network security device carries within it a very powerful set of procedures and analysis methods, capable of logging and analyzing everything from the most basic units of network traffic, the individual Ethernet packets, to monitoring behavior patterns and actively making decisions based on security needs. The network security device operates on a network bridge framework, making it invisible to both the local and outside network; all changes must be performed in person, or in a scenario where the pipeline to change settings is entirely separated from the network.

At its core, the network security device is designed to monitor every speck of Internet traffic that enters and leaves a local network or user's computer, or if desired, travels between sub networks and nodes on a corporate network. This configuration allows it unprecedented security capabilities for protecting sensitive information from leaving a network, but also provides a host of incredibly powerful tools to protect against incoming attacks. The network security device has full access to the header information contained in every network packet, including full source and destination information (IP addresses, MAC addresses) as well as protocol, service, and related pertinent information. On top of this, the full packet payload is available to the network security device, either in fragmented form or rebuilt as a cohesive unit, seamlessly within the device.

This full purview over network traffic allows the network security device to selectively block ports, like a firewall would. Payloads can be examined for suspect information in the same way an Intrusion Prevention System would. Based on security rules and network criteria, traffic can be selectively blocked and blacklisted, the way an Intrusion Detection System would.

Each of these security actions is fully logged, either within the network security device's buffer, or to an external (on or off-site) logging server for further perusal and archiving. The network security device itself is fully able to make security decisions based on rules (updated securely by the administrator), either in a basic capacity or as the primary (or only) line of network defense. Alternatively, multiple Network security devices can be coordinated to receive instruction from a central Network security device or similar security server, and manage the network topology as a single organism rather than a combination of composite parts. This allows for unprecedented power in preventing and mapping intrusion attempts, malicious incoming traffic, and other forms of electronic attack. Verification takes place both within the network security device and (optionally) within the central "control" Network security device, which allows for the ISP pipeline to be completely secured and free of any spoofing or subversion risks.

On top of this capability, the network security device can be configured to work with a secure server, using cutting edge key-based encryption schemes to individually identify Network security devices (allowing for quickly-authenticated connections between Network security device protected networks). The server can also be used to feed fingerprint details to the connected Network security device devices, allowing them to quickly update their rule sets to take care of brand new, previously unseen attacks. Attack details can also be sent to the secure server, where further action from simple logging, all the way to contacting law enforcement can be undertaken.

Beyond all of these features, each Network security device is a fully programmable and adaptable framework, with extensive customization versatility. Network security devices can be coordinated and programmed to fit the specific and unique security needs of any single user, or corporate network; these individual tools can be combined in numerous ways, to meet any security requirement. Logging is absolutely comprehensive, and provides administrators with unprecedented levels of interaction with Internet traffic, in real-time, as attacks occur and information is parsed. The network security device is an organic, comprehensive security device, and is invaluable in providing the tools necessary to manage and lock-down a network.

Operation of the Network Security Device Overview

A basic summary of the operation of the network security device 1 will now be provided, which operation will be described in greater detail below in connection with the flowcharts in the drawing. This example will describe the operation of the network security device in terms of data flowing through the network security device 1 from the communication device 12 to a server 18 on the network 16. It will be understood that the same general technique would be used for data flowing in the other direction, from a server 18 on the network 16 to the communication device 12.

Data objects 14 from the communication device 12 are accepted at the communication device port 12, and are stored in the data object memory 3. Some data objects may be split up into multiple data packets for transmission. If the nature of the data object is such that the complete data object is not present in one logical data packet, the various packets will be stored and reassembled in the data object memory 3 until the complete data object is present within the memory 3 for analysis.

Once the data object 14 in the data object memory 3 is complete, the CPU 6, executing the programming in the permanent memory store 7, analyzes the data object 14 using a plurality of rules and information stored in the permanent memory store 7 and the dynamic memory store 9.

If the data object 14 passes the screening determined by the rules, the CPU 6 releases it to be sent from the data object memory 3 out through the network communication port 4 to its destination across the network 16.

If, on the other hand, the rules flag the data object as objectionable, the transmission of the data object is blocked, and the network security device 1 will then take other actions, such as sending a message back to the communication device 12, or displaying a message on the display 8 or a device 13 connected to the physical interface 5. The user would then have to authorize sending the object using the physical interface 5 or the keyboard 8 or the tamper lock 11. The network security device 1 CPU 6 can also be programmed with other rules to take other actions upon detection of certain violations, as will be described in greater detail below.

For example, certain URLs may be blocked by the network security device, and certain patterns of information may be classified as potentially sensitive information and hence be restricted from being transmitted from the communication device. Specifically, one example of a pattern of information that may be predefined as part of the rule system would be any stream of numbers that resemble the convention used to record credit card numbers. If such a pattern of numbers is detected by the rules system, then a data object 14 containing such an object may not be transmitted to the intended destination address. At least some of the rules may come predefined to the end user of the product. Alternatively or additionally, the user may enter some sensitive information, such as his own credit card or bank account numbers or passwords or the like, and the information and possibly rules to control transmission of the information may be supplied or created through the physical interface 5.

The rules can ensure that no data objects 14 that contain sensitive information are transmitted to any URL, or may require that such objects only be transmitted to a white list URL or using an encryption or secure protocol, or both. The rules system may further distinguish between encrypted and nonencrypted data objects, and ensure that encrypted data objects are only transmitted to white list URLs. In the case that the decryption key is available to the network security device 1, it may also decrypt the information and handle such information as it would unencrypted information.

It should be noted here that in the method of the invention, all traffic passing through the network security device is passively analyzed; it is not executed, and not a single piece of code the network security device analyzes is ever "run" or allowed to pass hardware calls to the operating system. In fact, there is no pathway from the data to the network security device's operating system; no OS file can possibly be modified, and no hardware commands can be issued. The data is completely isolated. This implicit objectivity makes it impossible to circumvent the network security device's security processes by introducing malicious code into the device, or attempting to exploit a bug.

Operation of the Network Security Device Initialization

Figure 6:
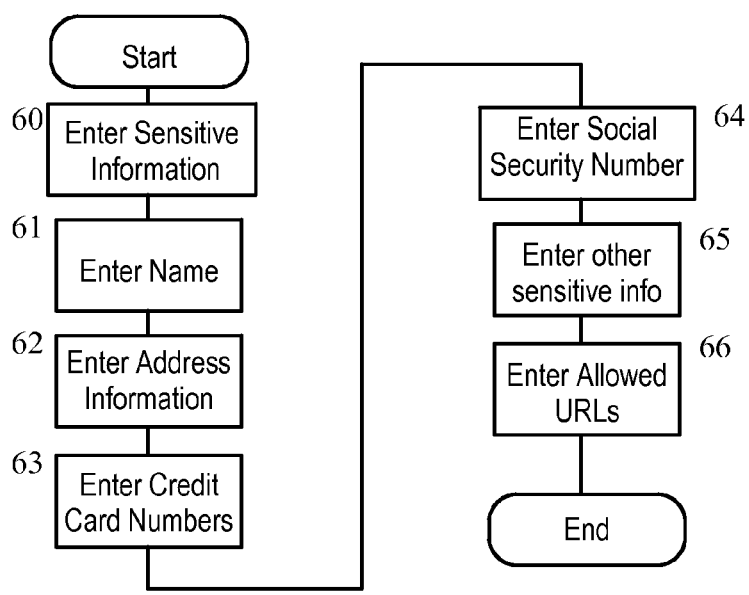
FIG. 6 is a flowchart illustrating the steps of a setup method for the network security device.

Reference is now made to FIG. 6, where the steps of the initialization method are shown. This method may be implemented when the network security device of the invention is to be used for the first time. Preferably, the initialization will be done through the physical device 13 connected to the physical interface 5, or through the keypad/display 8, or otherwise in a way requiring physical presence of the user at the network security device. This interface is invisible to the Internet, and can only be accessed by the authorized user standing next to the device. This approach will minimize the likelihood that the device might be improperly set up by an unintended source.

As mentioned above, the network security device 1 may also have had the rule system predefined and stored upon the device in the permanent memory store 7. In alternative embodiments, the initialization method can be carried out by each user who is going to make use of the communication device 12 that is associated with the security device 1. By having each user undertake the initialization method, each user has a profile that is used to implement a rule system that is specific to them. The profiles may be stored on a storage device similar to a flash memory card, or USB key that is entered into the physical interface 5 or tamper lock 11 of the security device 1 when a user wishes to use the communication device 12, and have the security device 1 enforce the rule system.

The initialization method is as follows:

step 60: Sensitive information is first entered. Sensitive information is any information that the user wishes to protect. If, for instance, the user is interested in protecting his online banking transactions, he might enter bank account codes, security codes, any information which could prove dangerous if leaked onto the Internet. Corporate users would enter parameters which would serve to identify sensitive information the company wishes to protect, or keywords which could indicate subversive activities on the part of an employee.

In the case of financial information, the user can input the institutions he wishes to deal with, and the network security device automatically builds a "whitelist" of authorized, legitimate Internet servers where the user's financial information can safely be sent. It is crucial that the sensitive information database, the whitelist, and other related settings are continually updated and refreshed by the administrator of the device; the network security device can only guarantee the utmost safety of information that has been entered into it, and if this information is incomplete or dated, the security of the network will be compromised.

step 61, the user's name is entered. The name of the user entered at step 61 is not necessarily sensitive information, however the name of the user may be required and used by the rules system when analyzing the contents of data objects 14.

step 62, the address information of the user is entered.

step 63 the user enters their credit card information. The inclusion of credit card information in the sensitive information database 32 in the permanent memory store 7 ensures that the rules system checks the data objects to ensure that credit card information is not transmitted except as where permitted. By ensuring that credit card information is not transmitted except when permitted, the potential for theft of any such information is effectively reduced to zero as no entity ever receives such information from the user.

step 64 the user enters their social security number.

step 65 the user is able to enter any other information they wish to have classified as sensitive information. Users may desire that other types of information not be transmitted from their communication device, and are therefore able to define other types of sensitive information in this step.

step 66 the user enters a list of allowed URLs. The list that is entered by the user is stored in the allowed URL database 31 in the permanent memory store 7.

Upon the conclusion of step 66, the network security device 1 may be used to implement the rules system. The sensitive information and the allowed URLs that have been entered may be edited by the user or through automatic updates based on a polling request that is sent from the network security device to a trusted Secure server. Updates that are received by the security device may be encrypted by the Secure server based on identifiers that are unique to the security device 1. Unique identifiers may include, but are not limited to the BIOS chip identification, and any serial numbers associated with the security device 1.

Figure 17:
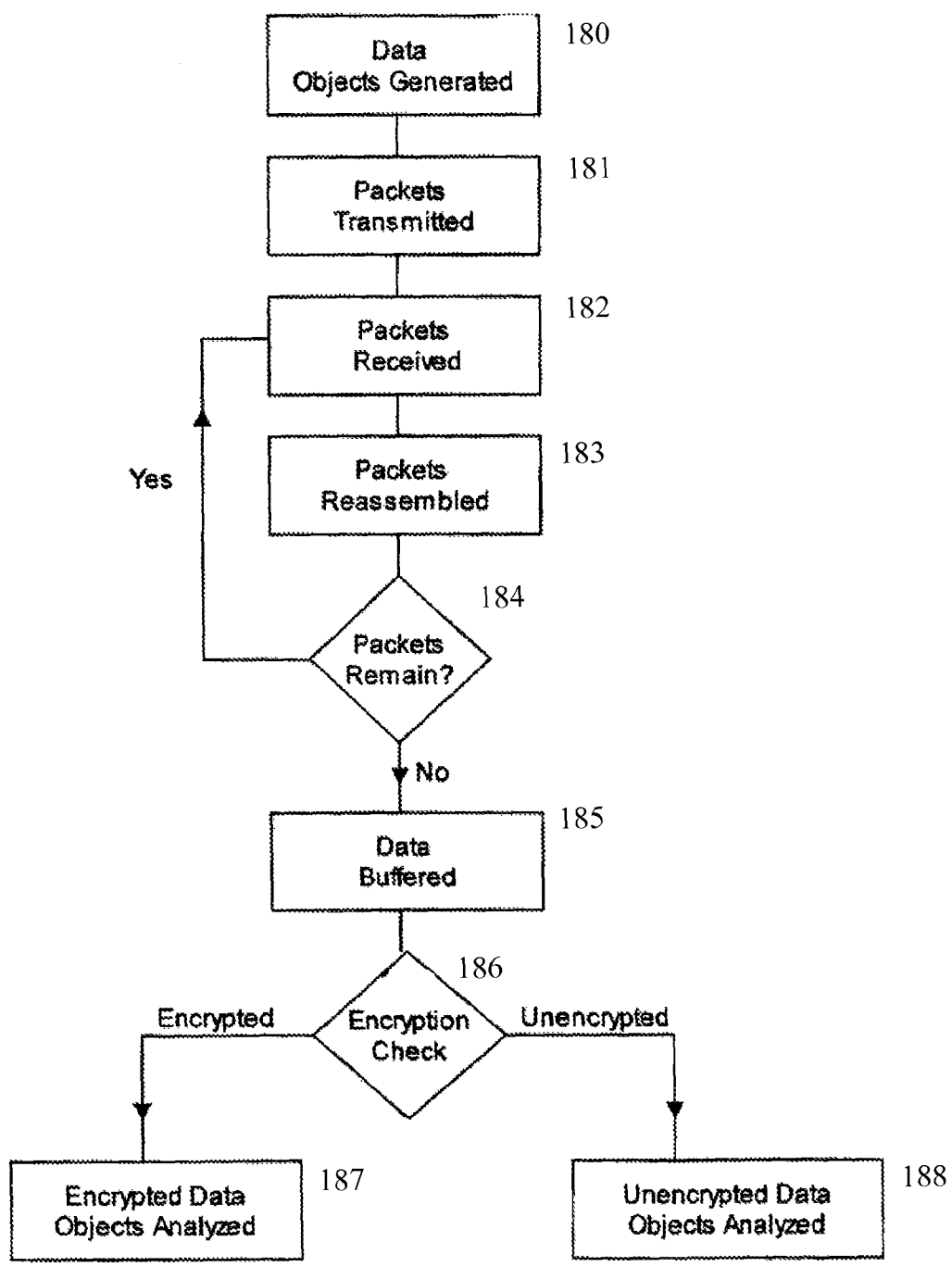
FIG. 17 is a flowchart showing a packet assembly method for use with the invention.
Figure 18:
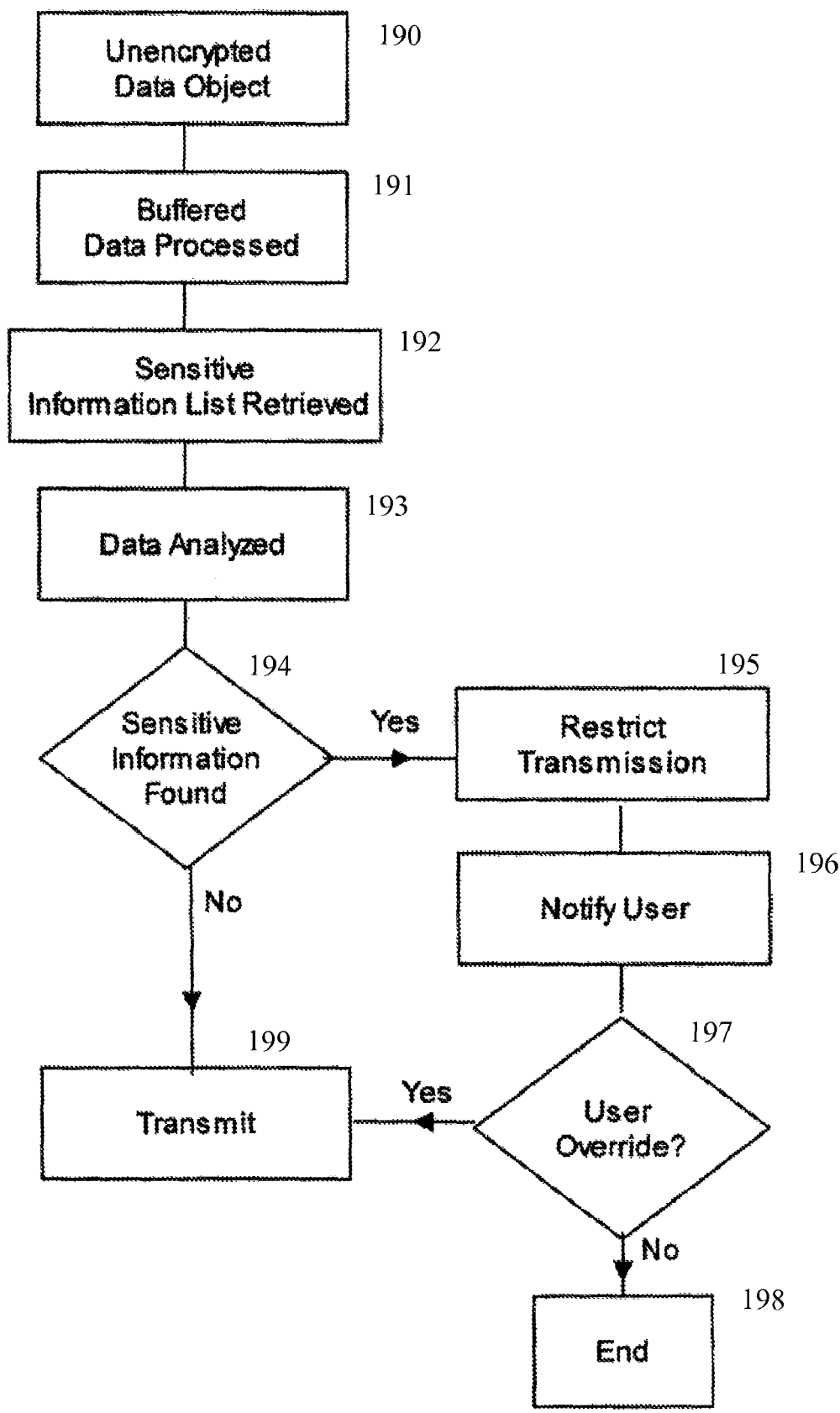
FIG. 18 is a flowchart showing a data analysis method for use with the invention.
Figure 19:
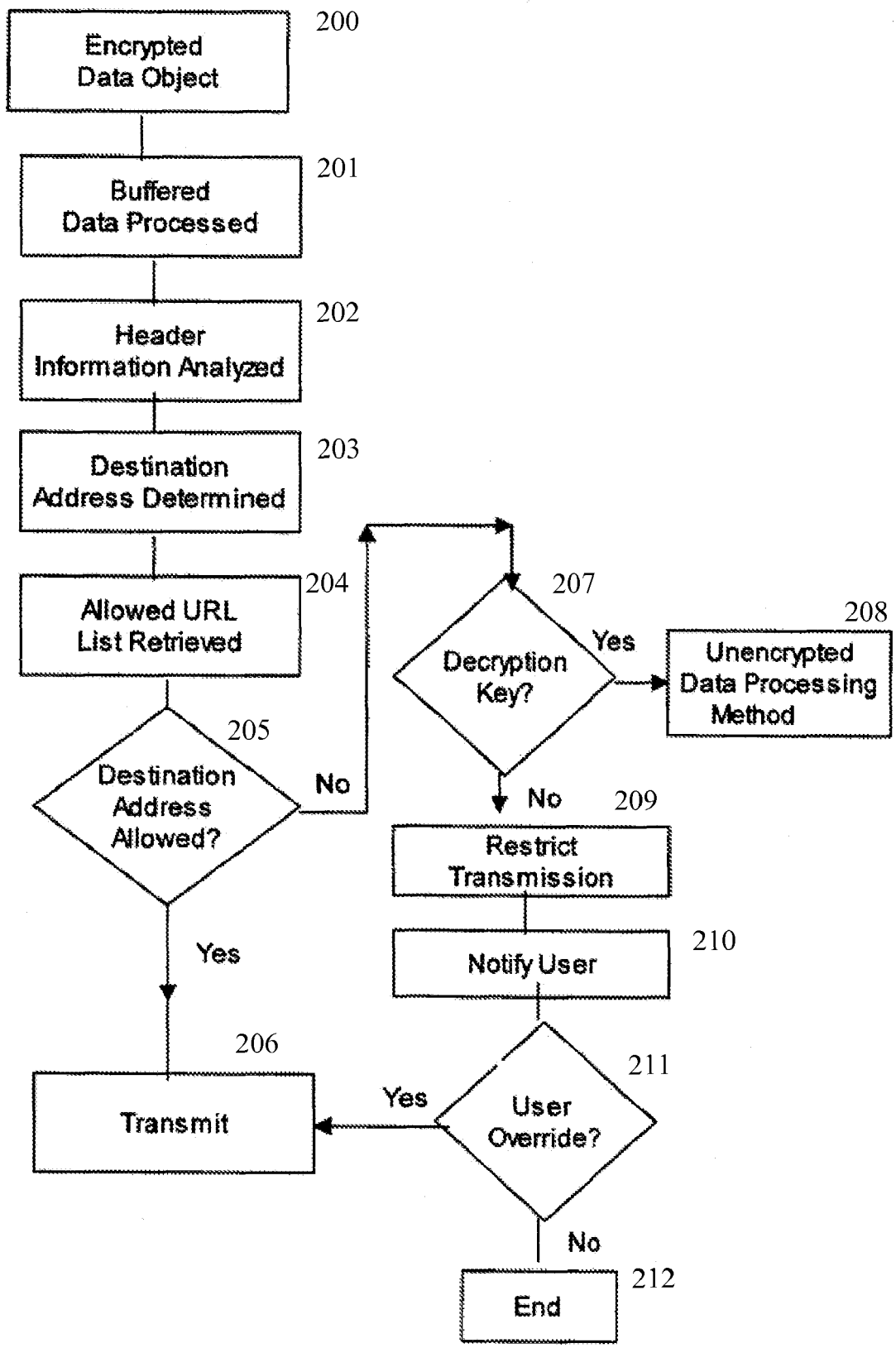
FIG. 19 is a flowchart showing an address analysis method for use with the invention.

Data Object Packet Assembly and Processing Overview FIGS. 17-19

What happens within the device is an advanced regimen of authentications and inspections, guaranteeing a user's information doesn't reach a malicious or unintended recipient. When a packet (the smallest unit of Internet information) exits a user's computer, for example, it enters the network security device. If the packet is of an unexpected type (traffic generated by viruses or Trojans, for instance) it is trashed immediately before it reaches the Internet. If the packet is a normal piece of Internet traffic, it enters the first level of analysis.

Figure 5:
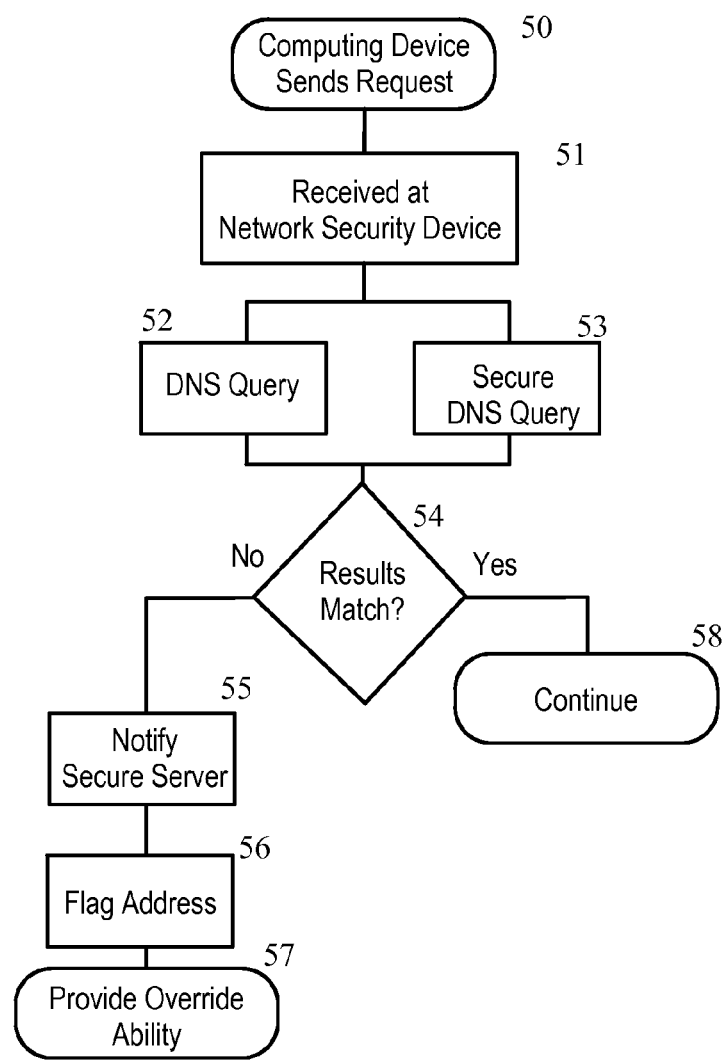
FIG. 5 is a flowchart illustrating the steps of a method of verifying DNS results using the network security device.

Reference is now made to FIG. 17, where the steps of a packet assembly method are shown. The packet assembly method operates whenever a data object 14 is transmitted from the communication device 12 to the network security device 1, or from network 16 to the network security device 1. As data objects 14 are generated they are not transmitted in one burst of data, rather they are transmitted over multiple packets. The packets may be of various sizes and there may be any number of packets that are associated with a data object 14. Data objects 14 when transmitted from a communication device may be encrypted or unencrypted. Regardless of whether the data is encrypted, the data is transmitted in packet form. As data objects 14 are transmitted from the communication device 12 to the security device 1 through TCP/IP, packets from various layers of the TCP/IP protocol are analyzed. In an embodiment, the network device 1 is able to analyze data objects 14 that are transmitted at the network, transport and link layers of the TCP/IP protocol.

step 180: data objects 14 are generated based on user commands and user requests upon the communication device 12. The data object may be generated and then broken up and transmitted as packets, or as the data object 14 is generated, packets may be formed and transmitted.

step 181: the packets that make up the data object 14 are transmitted to the security device 1. Upon a packet being received at the security device 1, an acknowledgment is sent to the transmitting device.

step 182: the packets are received at the network security device 1, and more specifically at the communication ports 2 or 4, depending on the direction the object is going.

step 183: As the packets are received they are reassembled. The packets may be reassembled in different formats including but not limited to hex or ascii format.

step 184: a check is undertaken to determine whether there any packets remaining. This may be determined based on the header information contained within the packets that generally specifies the number of packets that are associated with a specific transmission. If there are packets that are remaining to be received, the method returns to step 182, where further packets are received. If at step 184 it is determined that all the packets that are part of the data object 14 have been received, the method proceeds to step 185 step 185: the packet data that has been reassembled is forwarded to a buffer or queue for further processing. Upon the packet data being reassembled, a DNS security check may be performed as is explained in detail below with regards to FIG. 5. The DNS authentication method of FIG. 5 is used to prevent the unauthorized redirection of a user's request for a certain URL to an unauthorized website.

step 186: a check is performed of the data to determine whether the data object 14 represents encrypted data or whether the data is unencrypted. If it is determined at step 186 that the data is unencrypted, the method proceeds to step 188 where the method of FIG. 18 is initiated. If it is determined that the data is encrypted, the method proceeds to step 187 where the method of FIG. 19 is initiated.

Turning now to FIG. 18, the method is as follows:

step 190: the security device 1 receives an unencrypted data object 14 step 191: the unencrypted data object that has been buffered is processed by extracting the data sections of the respective packets that are found in the buffered data. See "data parsing", below, for details on this step.

step 192: the list of sensitive information is retrieved from the sensitive information database 32.

step 193: the content of the data object 14 is analyzed to determine whether there are any occurrences of sensitive information. Various pattern matching techniques may be used when searching for instances of sensitive information, including grep. In an exemplary embodiment, the sensitive information that is searched for at step 193 is based on all the sensitive information contained within the sensitive information database, regardless of the user that is associated with the sensitive information. This step may also include other rule-based processing, such as are described in more detail in the discussions of FIGS. 8 and 9, etc., below.

step 194: a check is performed to determine whether any sensitive information was found within the unencrypted data object 14. If sensitive information is not found within the unencrypted data object 14, then the method proceeds to step 199, where the unencrypted data object is transmitted to the communication network so that it may be transmitted to its intended destination address. If at step 194, it has been determined that sensitive information has been found within the data object 14, the method proceeds to step 195. In an alternative embodiment, after step 194, an optional check may be undertaken to determine whether the destination address associated with the data object is that of an allowable URL. If the data object is destined for an allowable URL, the transmission may be permitted, and if not, may be restricted.

step 195: the transmission of the data object 14 is restricted. If transmission of the data object 14 has been restricted, then (step 196) a notification message is sent to the communication device 12. The notification message may be a message that is displayed to the user upon the display means associated with the communication device 12, or may be an entry contained in a log file stored upon the communication device 12. Upon the user being informed that the transmission has been restricted, the user has the option of overriding the decision made by the security device 1, and allowing the data object 14 to be transmitted even though it contains sensitive information. The user in an exemplary embodiment is able to override the decision by deleting the sensitive information in the sensitive information database 32, and then attempting to retransmit the data.

step 197: In alternative embodiments, the user is given the option of transmitting sensitive information that has been flagged by engaging the tamper lock 11 associated with the device 1. By engaging the tamper lock 11, the device 1 is instructed to transmit the data object 14 that contains the sensitive information to the communication device 12 or destination address 20, as appropriate. When the user engages the tamper lock 11, in one embodiment the enforcement of the rules system is temporarily suspended only long enough to allow the data object to be transmitted to the intended destination—communication device 12 or address 20 through the communication network 16. In one embodiment, the user may only be able to make use of the override functionality when the sensitive information that has been detected is associated with that particular user. For example, if a user is attempting to transmit a data object containing sensitive information that is associated with another user's profile, the user is not provided with the ability to override the restriction, and transmit the information.

The method is used to operate upon unencrypted data objects when determining whether sensitive information is contained within the data object 14. If the data object 14 that originates at the communication device 12 is encrypted, an encrypted data processing method of FIG. 19 is used.

Reference is now made to FIG. 19, where the steps of an encrypted data processing method are shown. The encrypted data processing method is used to process encrypted data objects 14 that are received at the security device 1, whether outgoing from the communication device 12 or incoming from the network 16. The method is initiated (step 200) upon the determination that an encrypted data object 14 has been received by the security device 1. The processing of the buffered encrypted data object results in the extraction of the respective headers associated with the data object 14. Method then proceeds, as follows:

step 202: the header information is analyzed.

step 203: the destination address is extracted from the header information.

step 204: the list of allowable URLs are retrieved from the allowed URL database 31.

step 205: a check is performed to determine whether the destination address associated with the data object 14 is included in the list of allowable URLs. Also, a query is made to a Secure server to determine the IP address associated with the URL, and then a check is undertaken to determine if the destination address is one of the allowable list of URLs. If the destination address is one of the allowable URLs, method in one embodiment proceeds to transmit the object at step 206.

If at step 205, it is determined that the destination address is not included in the allowable list of URLs, but is not explicitly disallowed, method proceeds to step 207.

step 207: a check is performed to determine whether the security device 1 has access to the decryption key that may be used to decrypt the data object 14.

If a decryption key is present, then 208 the unencrypted data processing method of FIG. 18 may be initiated. In order to initiate the unencrypted data processing method upon the data object 14, the data object is first decrypted, and the method is then executed upon the data object 14, as explained above in connection with FIG. 18.

If it is determined at step 207, that the decryption key is not available to the security device, or if at step 205 it is determined that the URL is a URL to which transmission is prohibited, the method proceeds to step 209.

step 209: the transmission of the encrypted data object is restricted and is not transmitted.

step 210, where a notification message is sent to the user. In an embodiment, the notification message may be a message shown upon the display 8 on the network security device, or it may be sent to the communication device 12. In other embodiments it may be a status message that is stored in a log file accessible to the communication device 12.

step 211: Upon the user being informed that the transmission has been restricted, the user has the option of overriding the decision made by the security device 1, and allowing the encrypted data object 14 to be transmitted even though it is destined for an address that is not a safe address. In an exemplary embodiment, the user can add the URL to the list of allowable URLs and attempt to retransmit. In an alternative embodiment, the user engages the tamper lock 11 upon the security device 1 to allow for the previously restricted data object 14 to be transmitted to its destination.

At this point, the network security device has a re-assembled, complete segment of Internet data. Every webpage a user visits, every email they send, or piece of information they type into a form, travels back and forth through the Internet in these fundamental segments. The network security device is able to peer into every single segment that enters or exits a computer (or corporate network), and therefore is able to detect any piece of information it is instructed to search for.

Figure 7:
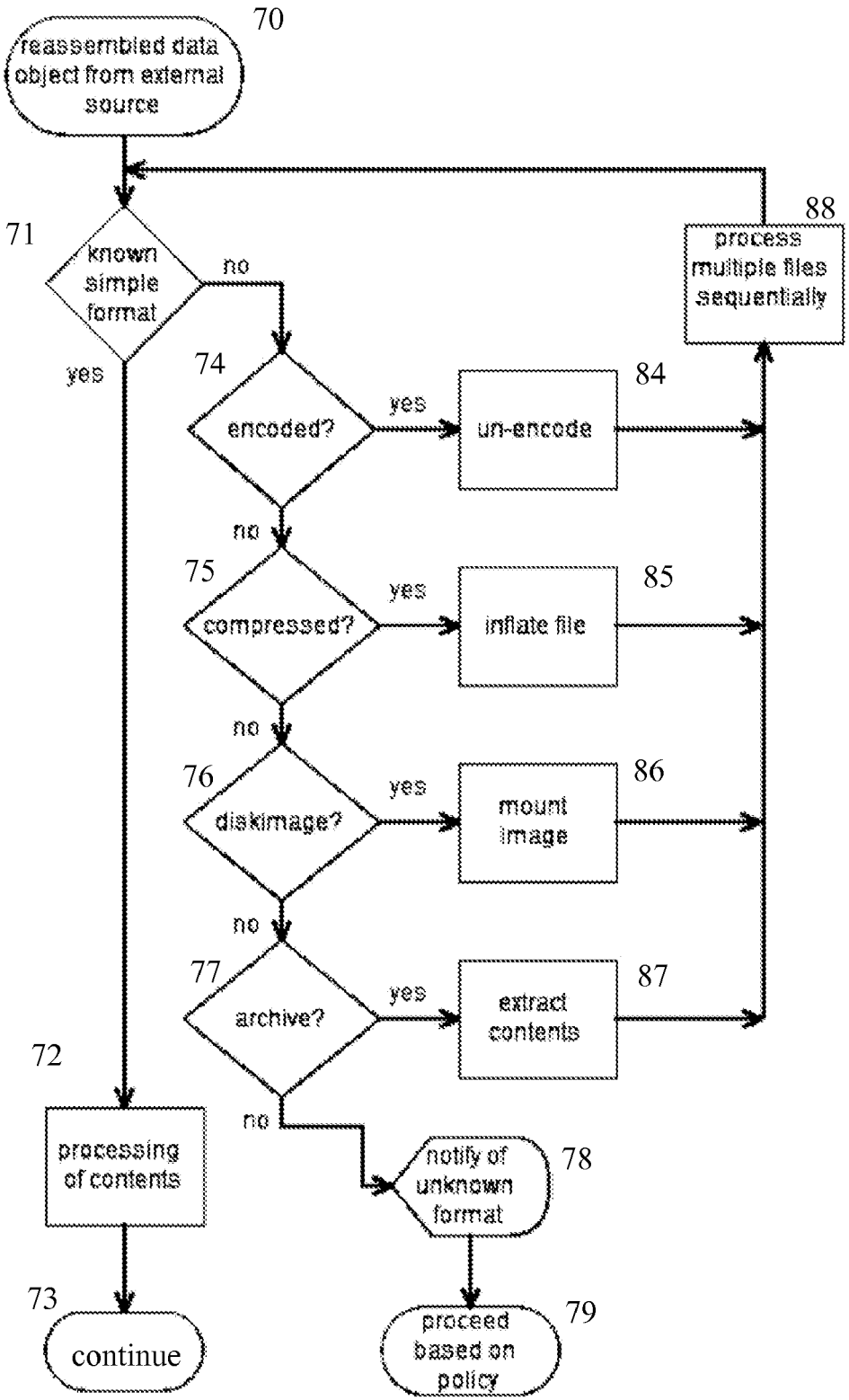
FIG. 7 is a flowchart illustrating the steps of a file parsing method for use with the network security device.

File Parsing FIG. 7

To present the least possible amount of inconvenience to users behind the network security device, a sophisticated parsing engine is employed to examine the contents of files as they enter and leave the local network. Only certain files require parsing; the network security device can readily examine most Internet traffic with minimal format parsing, if any. Problems can arise when compressed files pass through the network, as well as disk images and encrypted data. The network security device is designed to quickly and efficiently deal with these formats in order to maintain a minimal impact on the affairs of the local users.

If a file or ream of data arrives which cannot be instantly analyzed, it enters the network security device's parsing subsystem. If the file is of a recognizable and readily-parsable file type, the data are extracted and the contents are processed in the same manner as other Internet traffic. In the case of compressed files, the network security device has the processing power to quickly inflate (decompress) the archives on the fly, examining the contents and, if authorized, forwarding the original packets on to the local machine with a minimum of delay. Disk images that cannot be readily examined are subjected to a similar process, where the image is mounted virtually in the network security device, examined, and the packets either dropped or sent to the local user.

Encrypted files are theoretically the most difficult to deal with. A distinction must be made for encrypted website connections; sending and receiving encrypted data between a local network and a website is an entirely different process, and the network security device will only allow encrypted transactions if they are verified to be safe. In the case of encrypted files, the data arrive through a normal connection, and as such don't trigger the same authentication as a website connection. The network security device uses the private keys and pertinent encryption information provided by the local user or network administrator to decrypt the data; if decryption cannot occur, the administrator may choose to have the network security device drop the packets outright, or at least store them for later perusal.

This discussion provides more details of the file processing in step 191 of the method of FIG. 18. At this point, the data object 14 has been reassembled and, if necessary, decrypted. The object must now be processed to determine what sort of file it is, and take whatever steps are necessary to prepare the file for content analysis. Referring to FIG. 7, then, a method of file parsing for use with the invention might be as follows:

step 71: Data object 14 is analyzed to determine whether it is sufficiently simple to allow straightforward parsing, that is to say it's a simple file format. These files include text files (for example, txt, doc, pdf, or wpd or the like), images (jpg, gif, png, tiff, bmp and so on), videos (avi, mp4, etc.), audio files (wav, mp3, au, and similar), and numerous others which can be readily parsed without intermediate steps.

If data object 14 is found to be a simple file format, then (step 72) the file is parsed and processed according to the rules, discussed in more detail below, and the method continues 73. This step would actually correspond to the various other figures and methods of processing described herein, and is not necessarily a step in itself.

If data object 14 isn't a simple file format, it is checked in the following steps:

step 74: Is the file encoded using a method known to the system? Such encoding might include Unicode, binhex, mime, binary, and other systems known to the art. It should be noted that this step refers to standard coding of the file, as opposed to encryption of the data object, which is referred to in FIG. 18. An encoded file might be in an encrypted or unencrypted data object. If the file is encoded, data object 14 enters decryption module 84, where known keys and decryption methods are applied to decrypt the data object 14. When decrypted, data object 14 is checked by sequence module 88 to ensure the file is decrypted in the proper order, and fragmented files are reassembled. If it now appears as multiple files, then each of the files is sequentially returned to step 71, otherwise the entire object is passed on step 71 and is again checked to see if it is a simple file type.

step 75: the object is examined for compression to determine if it is of a compressed file type, such as zip, tar, sit, gzip, rar, or other known compression types. If so, the file is inflated using decompression module 85. When decompressed, data object 14 is checked by sequence module 88 to ensure the file is decrypted in the proper order, and fragmented files are reassembled. If it now appears as multiple files, then each of the files is sequentially returned to step 71, otherwise the entire object is passed on step 71 and is again checked to see if it is a simple file type.

step 76: the file is examined to determine whether it is a disk image file type, such as toast, iso or bin, or similar types. If so, it is mounted using image module 86. When mounted, data object 14 is checked by sequence module 88 to ensure the file is decrypted in the proper order, and fragmented files are reassembled. If it now appears as multiple files, then each of the files is sequentially returned to step 71, otherwise the entire object is passed on step 71 and is again checked to see if it is a simple file type.

step 77: data object 14 is examined to determine whether it is an archive file type, such as tar or the like. If so, the contents are extracted from archive data object 14 using the extraction module 87. Once extracted, data object 14 is checked by sequence module 88 to ensure the file is decrypted in the proper order, and fragmented files are reassembled. If it now appears as multiple files, then each of the files is sequentially returned to step 71, otherwise the entire object is passed on step 71 and is again checked to see if it is a simple file type.

If data object 14 cannot be categorized or parsed, a notification and/or log instance is generated using notification module 78. Policy module 79 is consulted, and depending on the security policy installed into the network security device 1, data object 14 is either destroyed or further processed by another routine. If files and data originating from an unverified server cannot be parsed due to obscure data structures, they can be logged and subjected to further examination at the leisure of the IT department. Through these parsing routines, and the network security device's efficient and fast processing, local users can expect a bare minimum of inconvenience as a result of the strict security policies imposed by the network security device.

Figure 8:
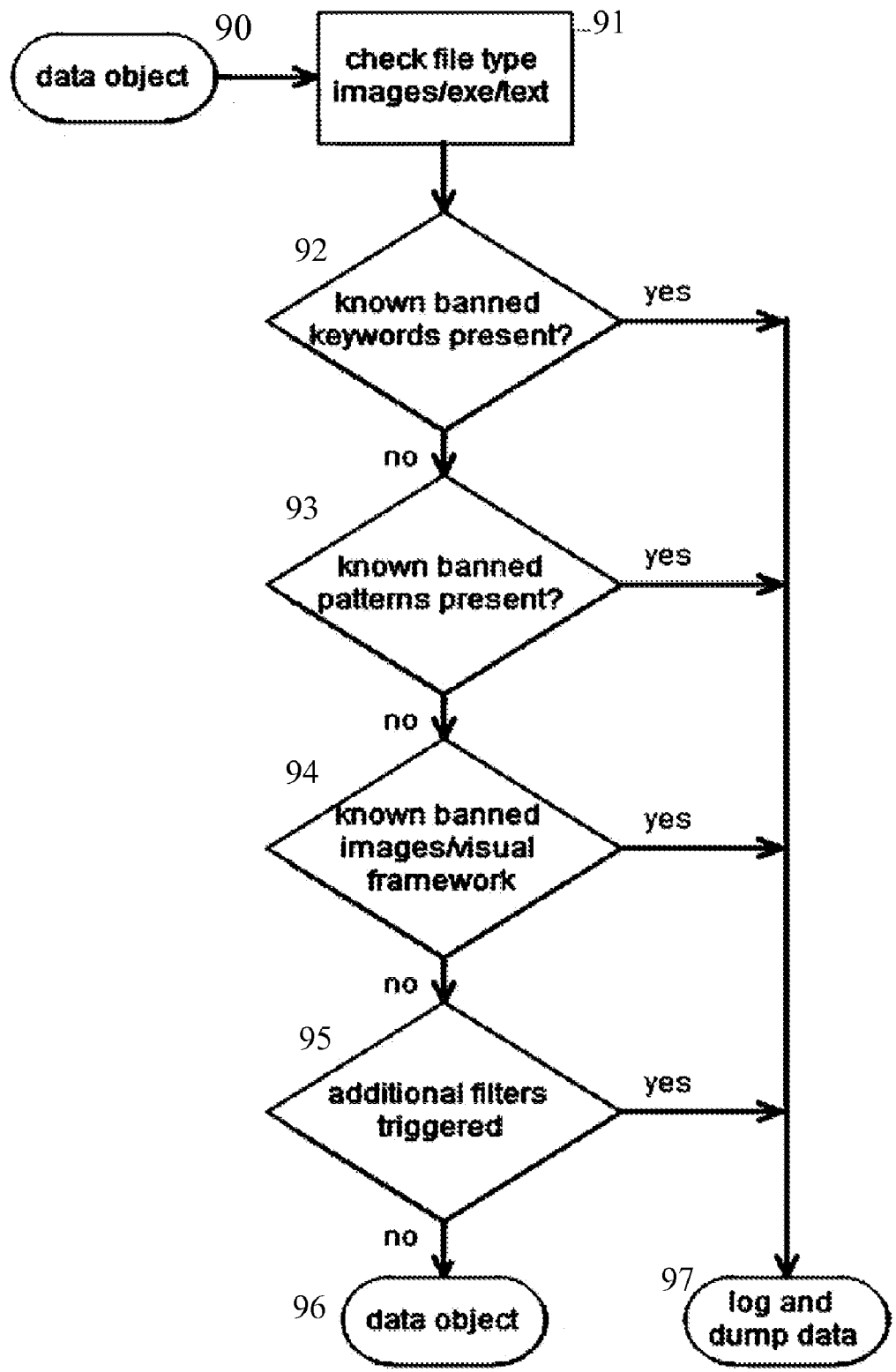
FIG. 8 is a flowchart illustrating the steps of a content analysis processing module for use with the network security device.

File Content Analysis FIG. 8

Once the files in the data object 14 have been parsed down to "simple" files, as discussed above, the analysis of the contents of the simple files can be performed. This corresponds to the data object analysis step 193 in the discussion of FIG. 18, above.

As shown in FIG. 8, the method may proceed as follows:

step 90: a data object 14 is supplied to the method for analysis.

step 91: data object 14 is categorized as an image, program file, text file, or any other type of parseable and readily-examinable file.

step 92: data object 14 is searched against a list of banned keywords and phrases. This list may be stored on the network security device 1 or on a secure external or internal server 19. If any of these keywords or phrases are discovered, data object 14 is logged and dumped, via logging module 97.

step 93: data object 14 is scanned against related traffic information to determine if a pattern or behavior has arisen, and if this pattern might be considered malicious. An example might be a data object 14 which contains a keyword "CONNECT" in the data payload, and is always destined for the same unusual port. This behavior would be identified by pattern module 93 as suspicious, and in such a case data object 14 would be logged and dumped via logging module 97.

step 94: any visual information within data object 14 is compared against a list of known banned images. Image matching module 94 can be programmed to look for key attributes of a given image, and pass or fail data object 14 based on the results of that analysis. If any visual data in data object 14 are determined to contravene the security policy enforced by image matching module 94, data object 14 is logged and dumped via logging module 97. Specific types of images (pornography, for example) can be quickly identified by reconstructing the image packets within the network security device 1, and examining the content of the image according to a series of criteria. This technology is widely employed in online search engines that allow for image searches. Pattern matching and other visual techniques can serve to filter out questionable images, while minimally impacting search speed and result quality; in the same way, the network security device can provide seamless data transmission while blocking suspect traffic from reaching the local network. This technology could be employed in public computer networks, like those in libraries and schools, to prevent unscrupulous users from accessing improper material inappropriate in the context of the network.

step 95: data object 14 may optionally be examined by filter module 30, where any additional user-defined or custom filters are applied to the payload contained within data object 14. If any filters are triggered in accordance with the network security device's security policy, data object 14 is logged and dumped via logging module 97, as before.

step 96: If none of the analysis modules identify data object 14 as suspicious, it is allowed to pass through to the next routine, or out of the network security device entirely, in the form of a screened data object.

Figure 9:
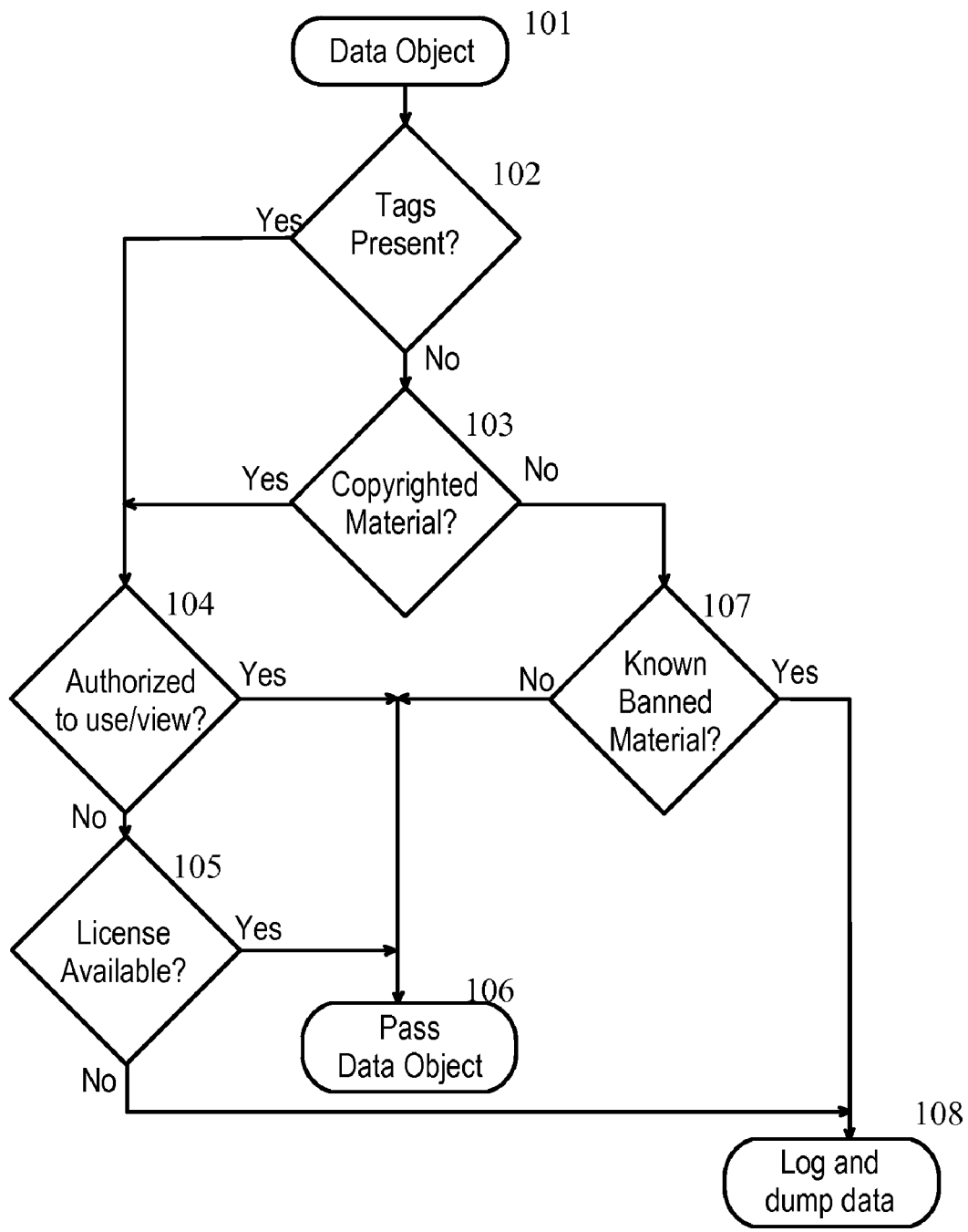
FIG. 9 is a flowchart illustrating the steps of a copyright compliance processing module for use with the network security device.

Copyright/Tag Protection FIG. 9

In addition to protecting a local network from attacks and malicious traffic, the network security device can be employed to prevent copyrighted or other illegally-accessed material from entering a local network. In the case of a library wishing to control the copyrighted content entering its network, or a corporation wishing to curb infringement by its employees, the network security device can quickly and efficiently identify and block traffic according to the copyright policy the administrator has chosen to employ.

Protection can be as simple as banning a list of known IP addresses, protocols, or services, and can be as complex as actively examining incoming files for evidence of copyright, and assisting the user in purchasing a license to use said information when copyright is determined. One of the most effective ways a piece of intellectual property can be controlled is through meta-information, including snippets of data called "tags". These tags are bits of information that describe the characteristics of the file in question; they assist in indexing the file, controlling its accessibility, and often identifying the terms of the copyright which governs it. Content providers could easily "tag" pertinent files with meta-information, information that is then parsed by the network security device and used to determine whether it is blocked or allowed into a local network.

If a file contains the proper tags, it is either allowed into the network, or license acquisition (or purchase) can be initiated. If no tags exist, the network security device uses a series of file-specific processes to identify the likelihood that a given file is copyrighted. If the network security device ascertains that a very high likelihood exists that the file is copyrighted and the user is unauthorized to view it, the network security device can bar the traffic from reaching the user, and logging the occurrence for possible study at a later date. This process of examination and logging would allow corporations and networks to protect themselves from possible copyright violation.

The method, as shown in FIG. 9, proceeds as follows:

step 101: data object 14 is passed to the method.

step 102: data object 14 is scanned for network security device-specific meta tags. If tags are present, indicating a copyrighted data payload, data object 14 is sent to authorization module 104.

step 103: data object 14 is scanned for copyrighted information or restricted content. If data object 14 does not contains copyrighted information or other restricted content, it is passed on to step 107 step 104: the data object 14 is analyzed to determine if the user is authorized to use or view the content of the data object 14. If the user is authorized to use or view the content, the data object is passed (step 106)

step 105: determine if a license for the unauthorized content can be purchased, or if permission can be obtained. If it is, the data object is passed on by step 106, possibly with some flag or message being sent back to the user to inform the user to get a license or permission, if he/she does not already have it. If no license or permission is possible, data object 14 is logged and dumped by logging module 108.

step 107: data object 14 is analyzed for banned material. If banned material is found, data object 14 is logged and dumped, and the user optionally notified, using logging module 108. If no banned material is found, the object is passed on in step 106.

DNS Verification

In addition to the checks performed in the methods described above, the steps of a DNS authentication method shown in FIG. 5 may also be carried out to provide an additional level of security.

One of the most complex types of phishing attack, one that is being seen with increasing frequency, completely removes the user's ability to "detect" the scam. With traditional phishing attempts there may be subtle clues that a given website is less than legitimate, and should be treated with caution. Increasingly complex phishing attacks have made it almost impossible to discern these clues, but they are not foolproof. To remove the risk that the user will detect the phishing scam, attackers have begun breaking into the DNS name servers that connect a URL address to a physical IP address. These name servers are the backbone of the Internet, and name resolution occurs every time a link is clicked, or a website is visited.

Normally when a user visits a website (perhaps www.paypal.com, for example) a request is automatically made to a DNS nameserver, typically maintained by the service provider the user is connected to. The request contains the address typed in by the user (www.paypal.com) and essentially asks which server this URL address corresponds to. The nameserver contains a vast table, constantly updated, that matches the numeric IP addresses of the actual server to the common URL addresses typed in by a user. When a DNS server receives a request for www.paypal.com for instance, it would normally return the IP address 64.4.241.32, which is the address of the server which runs the Paypal website. From then on, the users computer automatically sends all traffic destined for www.paypal.com (which is what appears in the browser's address bar,) to 64.4.241.32, the address of Paypal's server.

The problem arises when a DNS server is "poisoned", or broken into by a malicious attacker who changes the information used to match up addresses. An attacker, in this case, can change the IP server address associated with www.paypal.com, so even though the correct website appears in the browser's title bar, all information is being sent to a completely different IP address, one owned by the attacker.

A compromised DNS nameserver is one of the most insidious methods attackers use to steal information. A nameserver is essentially the link between a web address, shown in a browser's address bar (www.google.com, for example), and the actual server's numeric address (or "IP Address"). In most cases, a normal DNS nameserver will instruct anything that is destined for a web address to be sent to the corresponding numeric server address. A nameserver that has been tampered with, however, connects a regular legitimate web address (say, the website you'd log into for online banking) with the numeric address for an attacker's server. In this case, the legitimate web address still appears in the browser's address bar, but all information is being sent to a malicious server.

This means that even though every indication exists that the data are destined for a legitimate, secure server, the user is still being deceived. The network security device can detect even the most subtle deception, and automatically prevents any data from being transmitted. These levels of protection ensure that even if the information isn't explicitly entered into the network security device and identified as "sensitive", it is still protected against the numerous forms of subversion and electronic theft. Websites which seek to misrepresent themselves maliciously are automatically blacklisted, and no information can thereafter reach them, sensitive or otherwise.

The network security device uses an innovative DNS verification procedure to ensure that this poisoning does not result in a security breach. The network security device protects against this attack by intercepting every DNS call made by the local system or network, and making a separate DNS call to a secure server operated by a trusted party—preferably the one who supplies and maintains the network security device, but it is possible that others may provide the service.

The network security device then receives two DNS replies, one corresponding to the original request, and the other corresponding to the secure server request. The secure server is continually verified to be secure, and the nameserver tables are constantly updated to ensure that poisoning cannot take place. Knowing this, the validity of the normal DNS response can be gauged by whether or not it's the same as the secure server DNS response. If both entries are the same, the response is allowed to pass through to the local network, and the user experiences no interruption. If the secure server receives a reply which differs from that of the normal DNS, the reply is dropped and a series of security measures go into effect, notifying the user of a poisoned DNS, and automatically blacklisting and logging the malicious IP returned in the original reply.

This verification process preferably occurs with every single DNS request, ensuring that erroneous DNS address information from a "poisoned" nameserver is never used, and the user never forwarded to an insecure server. The verification is instantaneous, and does not result in any time delay or pause in Internet connectivity.

This real-time analysis is a first for network security devices, and allows users the freedom to traverse the Internet without fear of accessing compromised DNS nodes, or being vulnerable to phishing attacks. Subversion attacks are vastly minimized, and any attack attempts are comprehensively logged and analyzed, with data then sent to law enforcement agencies, if desired.

The steps of this method are as follows:

step 50: a computing device transmits a request to visit a certain URL.

step 51: a request is received at the network security device 1. The header data of the data object 14 is parsed to extract the destination URL.

step 52, a query is made by the security device 1 to a DNS 10 that is specified by the computing device 12. As is conventional, the DNS returns an IP address assigned to the URL.

step 53: a query is made to the secure server 19 that is maintained by a trusted entity. Again, the response is an IP address assigned to the URL.

step 54: a check is performed to determine whether the IP address returned by respective steps 52 and 53 match.

If the two match, then 58 the method continues on. For example, the data object 14 may be transmitted to its destination address safely, provided that the methods of FIGS. 18 and/or 19 have operated upon and approved the data object. Alternatively, the network security device may continue on with one or more of the other verification procedures described below.

If the IP addresses do not match, this means that a malicious attempt is being made to redirect transmissions from a computing device 12 to a malicious address. The method proceeds to step 55, where the secure server 19 is notified. The secure server 19 upon notification may optionally inform the holder of the domain name that attempts are being made to redirect traffic that is destined for their site to a malicious site. When notification is sent, a law enforcement agency or the holder of the domain name may initiate an investigation.

step 56: the URL may be flagged on the "black list" in the URL database 31, or the IP address may be stored as a compromised address, and transmissions that are subsequently destined to it may be restricted.

step 57: the user is given the option of overriding the flagging of the address as a black list address. Where the user is given the option of overriding the flagging of the address, the user is presented with an option by which they may continue to allow data objects 14 that are destined for what may be a non authentic address to be transmitted. The techniques for allowing a user to override rejections are described in the methods above, and will not be repeated here.

Figure 10:
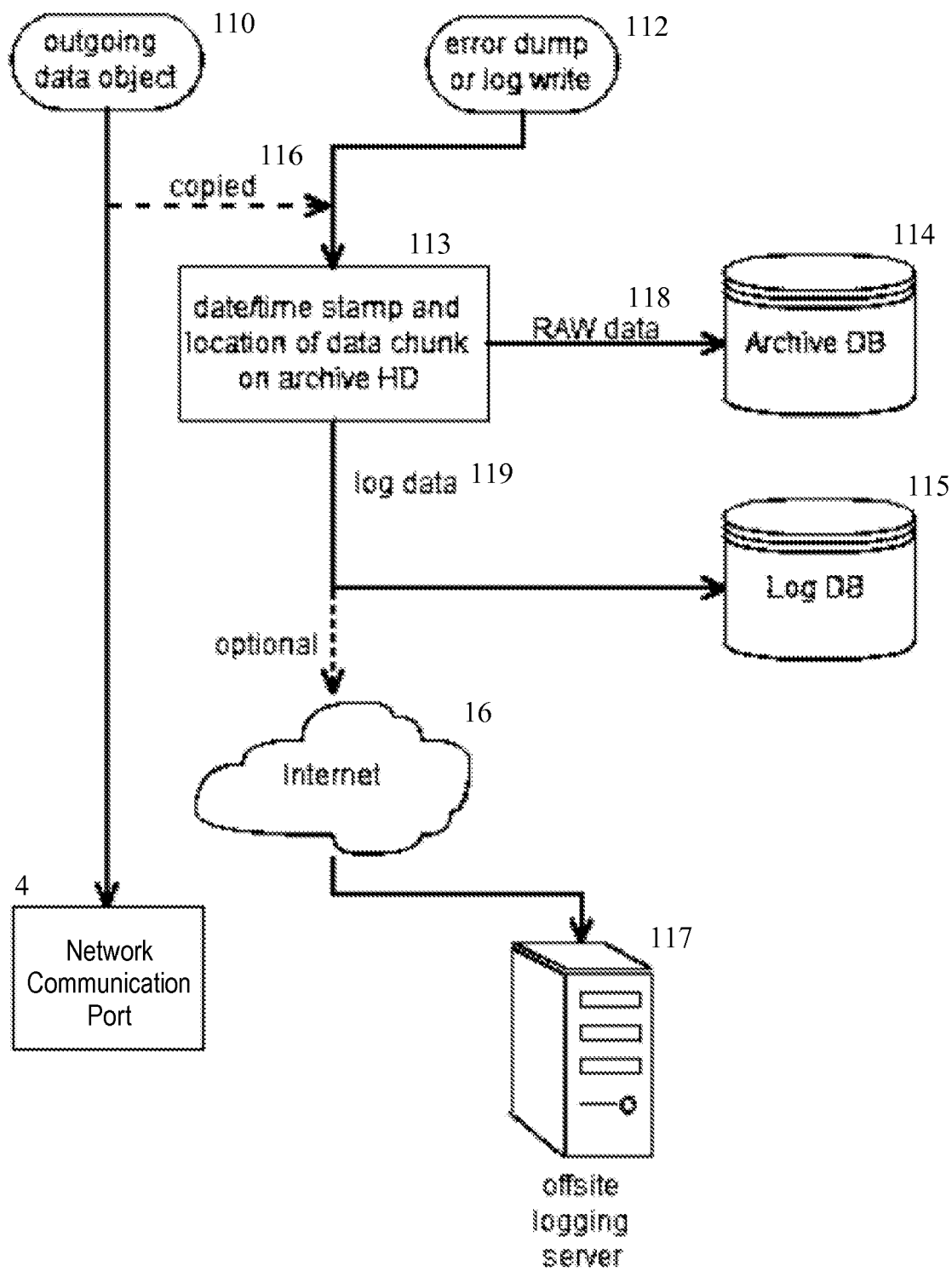
FIG. 10 is a flowchart showing how the network security device can be used in a system for coordinating and logging information passing through the device.

Compliance and Logging FIG. 10

The network security device of the invention can also act as a compliance logger storing either internally or off-site, as shown in FIG. 10, all communications both in and out bound from specific executive or other computers requiring an incorruptible record of transmissions for compliance purposes. Indeed it may also be configured to act as an intelligent filter compiling and archiving only those communications subject to compliance scrutiny. It may undertake to index, by content, material to be archived thereby facilitating future reviews.

The compliance and logging method of the invention is as follows:

step 110: outgoing data object 14 is passed to the method. Data object 14 still exists within the physical Network security device, until it exits through the network security device network communication port 4. Before exiting, the data object 14 is copied 116.

step 112: similar data objects, from other routines, also enter stamping module 113, and are treated as copied data objects 116 as well.

step 113: the copied data object 116 is stamped with identifying indicia, such as pertinent date, time, and location information step 118: the copied data object 116 is written in the form of raw data to comprehensive archive database 114. Archive database 114 is largely unfiltered, and represents a complete redundant (through RAID or other optional redundancy) database of every data bit copied processed by the compliance and logging routine. Archive database 114 grows rapidly as traffic passes through the network security device and must be continually managed by the administrator.

step 119: the copied data object 116 is written in the form of a log entry to logging database 115. Logging database 115 is a chronological, redundant archive of object-specific log entries containing the date, time, and location information stamped by stamping module 113. Logging database 115 is continually managed by administrators to ensure efficient network operation and to discover any problems. Optionally, the same log data can be sent through the external network or Internet 116 to an off-site logging server 117. This server is managed at a geographically distant location, to prevent physical damage destroying all records of a single packet, at the same time. Off-site logging server 117 can be accessible by administrators, but is preferably managed by a third party.

Figure 16:
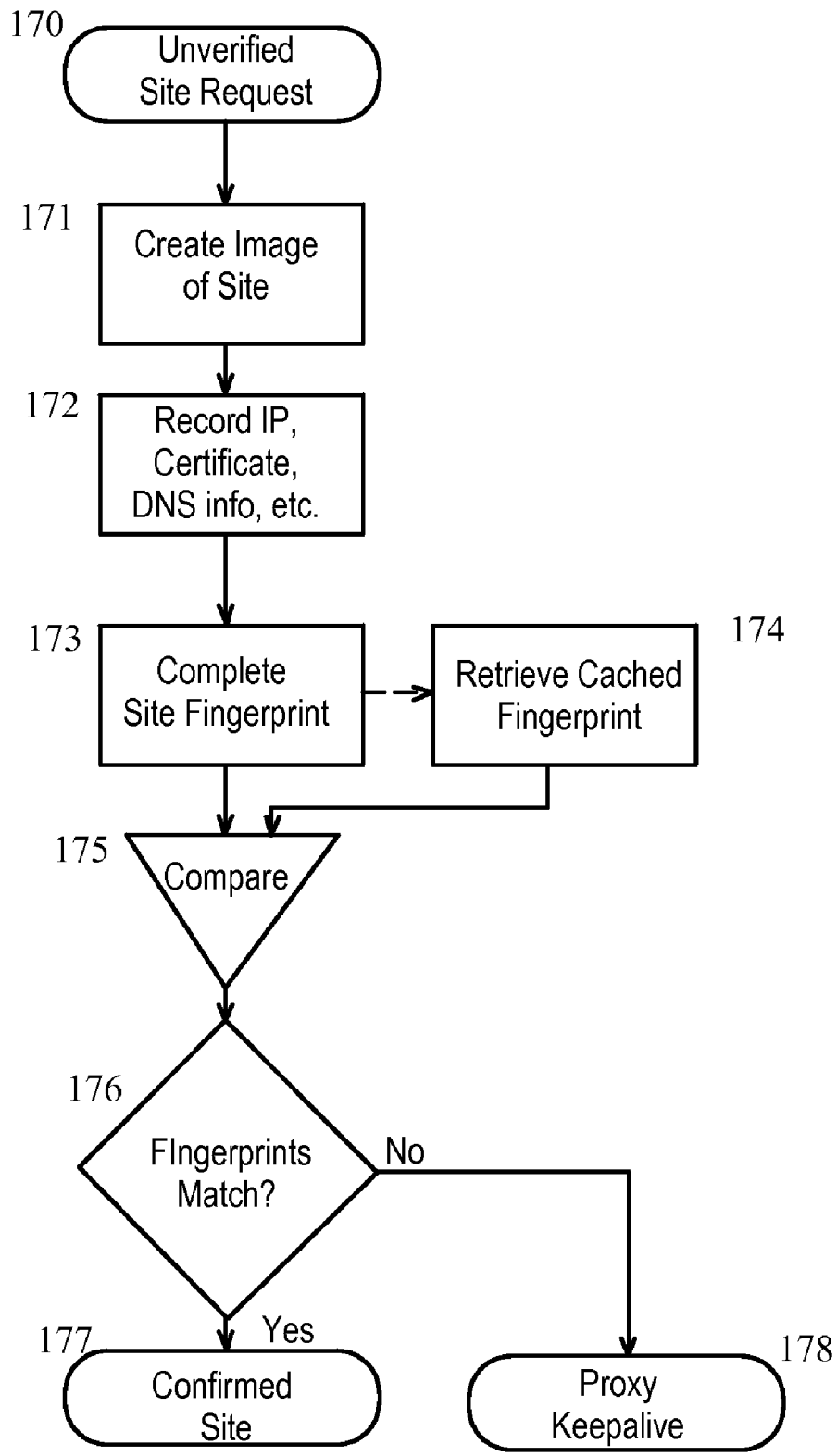
FIG. 16 is a flowchart showing the operation of the network security device of the invention, as it might be used with a website requiring security verification.

Website Image Comparison FIG. 16

In addition to being able to analyze images for content, image comparison can be useful in establishing counterfeit sites. Network security device and the Secure Server can establish libraries of high profile or designated portal or entry page images (similar to a screenshot) for this comparison. This module is activated when a suspicious data package is suspected to contain a malicious web address. An "image" of this web address is drawn using published standards, and this module scans the existing image library from low to high resolution assessing points of similarity. If a mostly-similar image is contained in the library the module can readily establish which site is being counterfeited or spoofed. This facility allows for notification of the PC user, law enforcement or other interested third party such as the site owner that a phishing/spoof broadcast is underway.

In addition to the site images gathered and stored in the Secure Server and/or Network security device adjunct data files are also stored containing site specific parameters such as the IP address(es), authentication certificate(s) and other information allowing for positive validation of the site. This facility may be used by the PC owner as a redundant verification of the destination when communicating with a site even though it may be an "approved site". This additional identifying information can be "matched" with the harvested site image, to form a complete fingerprinted package.

In conjunction with the DNS/Secure Server function can be packaged as a software module for inclusion in a PC without the network security device box.

The image mapping and fingerprinting method of the invention is as follows:

step 170: an unverified site request is received. This is defined as an attempt by a user to access a site which requires security verification, be it an encrypted site or an unencrypted site. This site may have been otherwise verified by other routines within the network security device, or unverified completely, subject to further verification once the Website Image Comparison routine of FIG. 16 has been executed. Thus, the unverified site request 76 represents a site that the network security device has identified as benefiting from an additional layer of analysis.

step 171: the unverified site request is interpreted by the network security device's internal "drawing" mechanism, which might be as simple as a web browser approximation, or as complex as a comprehensive set of published web standards and processing modules. The intent is to produce, through consistent methods, a graphical representation of unverified site request. This is stored in the form of a "site image".

step 172: retrieve and record identifying information including an IP address, web address, timestamps, file sizes, and other specific information relating to the unverified site that can be used to personally identify it as unique on the Internet or network. In the case of a site that employs SSL, an encryption security certificate can also be retrieved and recorded.

step 173: combine the site image and identifying information into a complete "site fingerprint" which can be used to uniquely identify a website.

step 174: retrieve a cached site image and fingerprint from external secure server 19, or from an internal caching routine within the network security device 1.

step 175: compare the site image and fingerprint to the cached image and fingerprint.

step 176: further compare the personally identifiable information, in both site fingerprint and the associated cached fingerprint, to determine if both sites are in fact the same website. If the fingerprints match (the security certificates are the same, they have the same IP address, and so forth) and the comparison of site image and cached site image yields a pair of site images which are identical beyond a probability threshold (for example, 95% or more similar visually), then (step 177) the site is deemed a confirmed site, and the user is allowed to proceed. If the comparisons do not match, a spoof has been detected. The offending site can either be dumped from the network security device 1, or sent to proxy keep alive module 178, wherein the connection is maintained, but re-routed by the network security device to a law enforcement agency for further investigation.

Viruses and Other Malware Security Threats

The network security device can be used alongside, and not instead of, other forms of security on a typical network. However where desirable or necessary it can substitute for other forms of security. In the case of Trojan-proxy viruses, and indeed other virus traffic, the network security device provides protection in two distinct ways.

First, since the network security device examines traffic at the lowest levels of the network stack, every fragment of virus traffic passes through it and none can be hidden or rerouted to escape the network security device's examination. For this reason, the network security device can be employed to continually search for malware such as viruses, spyware or malicious traffic using a combination of virus signatures (similar to those written by security companies) and heuristic analysis. In the absence of signatures, heuristic analysis would assign a probability of malicious intent to a given traffic socket, and send queries to the user or local computer to try and assess the validity of that socket. If traffic is being sent in such a way that the network security device identifies a high probability of malicious intent, and separate queries cannot validate the socket, it is shut down and all information related to it is recorded. The user is alerted, and further security actions can then be taken.

The second way the network security device protects the user is by acting as a specialized firewall. During normal operation the network security device continually opens and closes pathways to the Internet depending on its many verification routines, so it is essentially always acting as an intelligent firewall. In the case of virus analysis, the network security device can perform a series of tests to identify and shut down virus traffic. If the heuristics engine identifies a suspicious transmission for instance, the network security device can activate a "locked down" configuration and shut down the majority of ports on a system until the infection can be properly dealt with. If the heuristics engine continues to detect malicious traffic on a port that is required to remain accessible, the firewall can be taught to pick out individual packets matching patterns considered to be strongly indicative of virus traffic.

All of this would take place instantly and autonomously, providing a vastly improved level of security during the lag time between a virus's presentation and its cure. The adaptability of the network security device allows it to not only to work with other security devices and software systems, but also even to emulate and act as a supplement to them.

The common denominator is that every single instance of electronic theft is still constrained within the basic rules of the network's technology. All the information is still sent as discrete packets according to published standards. This is the inherent advantage the network security device possesses over other security products, and all forms of electronic attack; it works in such a detailed, fundamental way, at the same level as the network's very structure. Not a single scrap of information can sneak through at this level; absolutely everything is analyzed. The sheer breadth of information the network security device is capable of collecting makes it ideal for generating break-in statistics, phishing attempts, and all sorts of useful data. Collaboration has proven successful in the Internet security field in the past, and the potential for collaborative defense is very attractive with the network security device. Users could opt-in to an interconnected web of information-sharing, where system configurations are compared and attacks are logged continually. This data would prove immensely useful for assessing the risk of a given network topography or system setup, and would provide an evolving picture of the methods attackers develop to break into networks. With this information in hand, the network security device could be continually refined and hardened, so as to always present the maximum level of security to the user.

It will be understood by one skilled in the art, that the methods that have been described above may be implemented as independent methods on a network security device 1.

Figure 12:
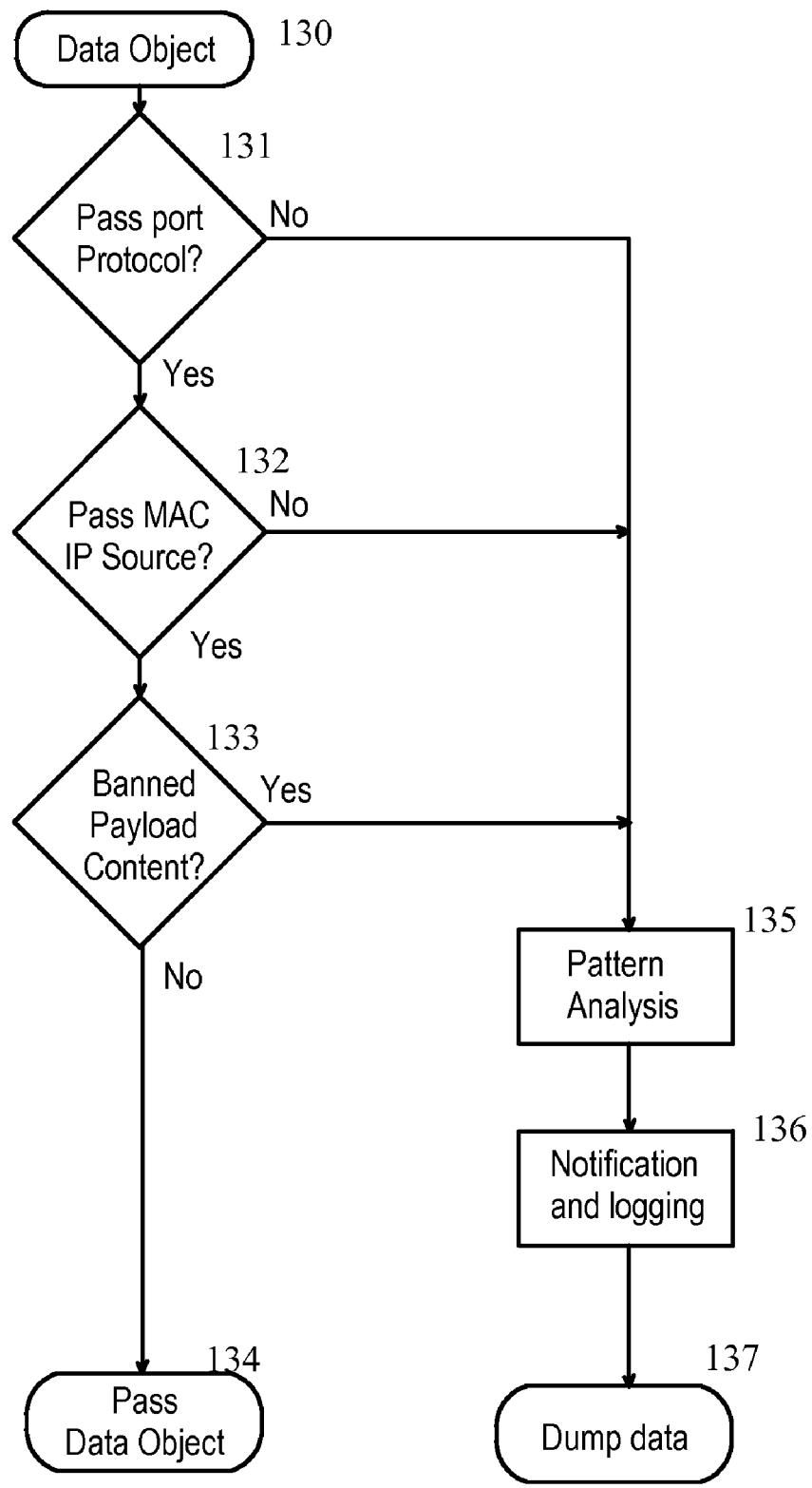
FIG. 12 is a flowchart showing how the network security device of the invention functions as an adaptive firewall.

Adaptive Firewall FIG. 12

The network security device acts invisibly as a network bridge, and has an unparalleled vantage point over a local network. Like a sort of panopticon, the network security device continually examines traffic between every node it's connected to, without any node or external computer having any idea that it's being monitored. Due in part to this invisibility, the network security device can be employed as a very effective and complex firewall.

A firewall typically has a set of criteria it uses to pass or reject Internet traffic as it passes in and out of a network. An external computer attempting to make a connection to a port on the local network, for example, will typically be stopped by the firewall. "Portscanning" is a common method to assess the vulnerability of a network, and consists of numerous attempted connections on common ports. The firewall is often programmed with the logic that, in most cases (with the primary exception of servers) the local network need only initiate connections, not reply to external requests. Therefore, external requests are often dropped by the firewall, and usually in such a way that the external source garners no useful information about the local network; often the external computer cannot even verify the local network is active. From the perspective of a computer on the local network, business proceeds as usual, as the firewall takes care of the suspect traffic packets and the local computers aren't exposed to the attack. Firewall rules can be much more complex, blocking specific protocols, servers, and services according to the security needs of the network.

The network security device sees every packet passing in and out of a local network, and every piece of header information the packet contains; based on the same rules as a firewall, the network security device can be employed to drop or reject packets which meet the necessary criteria, without the local network ever seeing the suspicious behavior. The network security device differs from a typical firewall in that it inspects both the packet header information (source IP, port, and so forth) and the data payload. This vastly increases the number of rules and filters that can be installed on a network; the network security device can be instructed to block certain types of encrypted traffic, data matching specific online protocols, or even data containing keywords which might be considered suspicious in the context of the local network. In addition to being comprehensive, the network security device's firewalling capabilities are also adaptive; common behaviors and conspicuous vectors of attack could raise flags when they are logged, prompting further analysis by the network administrator, or automatic creation of new firewall rules.

Imagine a virus attacks on a specific port, one that isn't commonly used for any other service. The virus sends "connect" commands in an attempt to open a network connection subversively. A typical firewall might be programmed to block all but a few select common ports, and thus the virus traffic is halted. A Network security device configured as an adaptive firewall would also block the traffic from reaching the local network, but through logging the suspicious packets, would see that the word "connect" is frequently used in this malicious traffic. The network security device's logic could associate the word "connect" with continued traffic to the same, unusual port. Weeks later, when a variant of the virus begins targeting the network, it might use a common port instead of an unusual one. The traditional firewall would be allowing traffic on common ports to continue unimpeded, and the virus would be allowed to make connection attempts; the network security device would recognize the same suspicious behavior used in the previous attack, with only the port number changed. Depending on the "freedom" the network security device is allowed, it could automatically generate a new firewall rule blocking the virus traffic from the second port, or at the very least, it could immediately notify the IT department of a possible variant attack. This adaptability, combined with an unprecedented level of information management, would allow the network security device to act as a firewall that continually evolves to meet new threats.

The method of the invention proceeds as follows:

step 130: data object 14 is received by the method.

step 131: data object 14 is parsed and the port/protocol is examined. If the port/protocol is disallowed by the network security policy, data object 14 is sent to pattern module 135.

step 132: data object 14 is examined for allowable MAC/IP source. If this source is disallowed by the security policy, data object 14 is sent to step 135.

step 133: the data object is examined for banned payload content. If such content is found, data object 14 is sent to step 135.

step 134: the data object is passed.

step 135: the port, protocol, and other header characteristics of data object 14, including the time of its arrival and pertinent data payload information are recorded in a buffer, which is searched for patterns among the incoming traffic step 136: notification is sent and the suspicious pattern is logged.

step 137: data object 14 is dumped.

Figure 13:
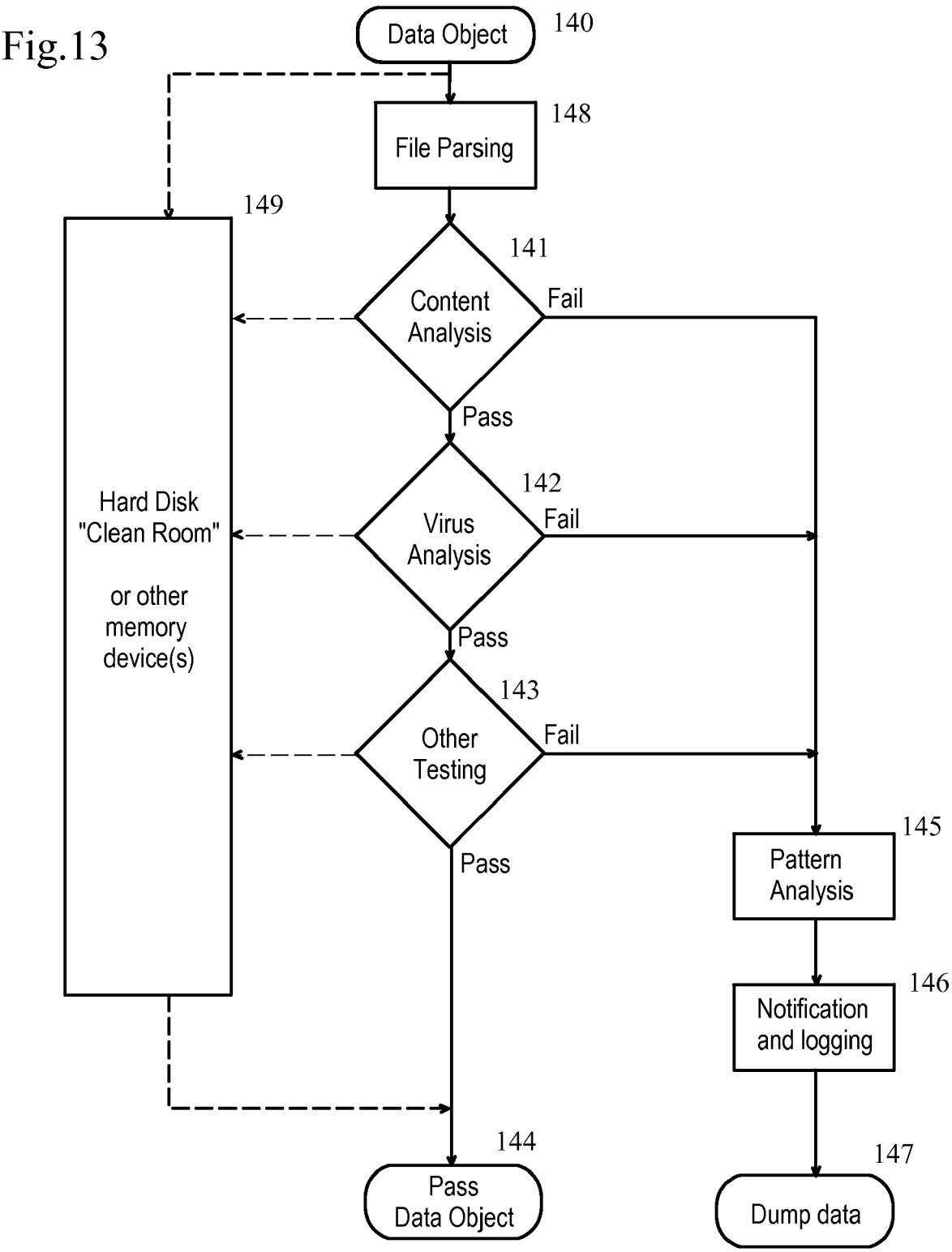
FIG. 13 is a diagram of how memory in the network security device acts as a "hard disk clean room".

Hard Disk Clean Room FIG. 13

For ease of description, hard drive, disk and hard disk are used in this section to describe any physical storage method, be it a traditional magnetic hard drive, a flash-based drive, or a series of RAM banks, in any logical or physical configuration. The specific type of storage method used is dependent on the speed, volume, and reliability required to manage a given network. Any storage method with sufficient volume for analysis, coupled with the required read/write speeds to prevent network slowing, and the necessary lifespan, would be a candidate for the network security device's hard disk clean room.

To analyze incoming and outgoing network traffic, the network security device must reconstitute fragmented files and buffer Internet traffic while it executes its decision processes. To allow this, without introducing traffic onto the operating system's memory module, the network security device is equipped with an internal hard disk. The disk has no ability to execute code; the only code is executed from the protected memory module, and may act upon the hard disk's contents. This disk is continually flushed as traffic is allowed to pass through the network security device, unless some triggered procedure necessitates that the traffic remain in memory.

Since no operating system runs on this hard disk, code within traffic packets cannot execute itself, let alone access hardware hooks or create files. For all intents and purposes, the code within the hard disk has no idea it's being accessed and scanned; this monitoring takes place completely passively and thus securely. For this reason, the hard disk is essentially a "clean room", allowing viruses and other malicious code to be effectively analysed and deleted without ever having a single opportunity to execute their code, or take any action whatsoever on the network security device or the system protected by it.

An allegorical example would be the case of a traditional, medical virus laboratory. Two methods might be postulated to detect a virus; in one, the doctor enters the room containing the virus with no safety equipment. Gloves are not used, nor are masks or other barriers, indeed the only measure of safety is the care and procedure carried out by the doctor. In this case, it is apparent that the possibility for infection exists; the doctor is manipulating the virus, but a lack of isolation allows the virus to interact back with the doctor. The second method involves the full gamut of protections, from gloves to a separate air supply and all necessary physical barriers. In this scenario, the doctor is still manipulating the virus, but there is no vector for the virus to manipulate the doctor; manipulation only occurs in one direction, and the virus never "sees" a host in which to infect, because it never encounters a suitable environment.

The same is true with the network security device; the hard disk clean room is completely isolated from the operating system, and all analysis is carried out in one direction. The operating system and composite logic is allowed to manipulate and analyze any malicious traffic (be it viruses or banned content) that exists on the hard disk, but none of this malicious code ever "finds a host", or encounters a vector through which to affect the operating system. The analysis is completely safe, malicious code cannot be executed, and the operating system cannot possibly be modified by any code within the hard disk clean room.

This method of analysis is a marked improvement over the vast majority of computer firewalls and virus scanners, which are forced to run on the same system that might house the infection. A virus, or especially a rootkit, that has infected an operating system's hard disk has the opportunity to run code which damages the operating system, or even disables security measures to hide itself. Objectivity is destroyed, and the operating system and associated security software can never be fully certain that the infection is completely gone, and not merely hiding itself from the observation tools built into the operating system. Having a separate hard disk, a "clean room", allows the network security device to maintain its objectivity and perform truly comprehensive analyses.

The method of the invention proceeds as follows:

step 140: data object 14 is passed to the method and immediately follows object storage procedure, wherein it is sent to the hard disk "clean room" 149, an environment completely separated and isolated from the network security device's core logic and operating system. Hard disk 149 may exist as a standard magnetic hard disk, a flash-type storage device, a set of RAM banks, or any other data storage scheme, provided no pathway exists for code on hard disk 149 to access the network security device's core logic and operating system.

step 148: data object 14 is observed and analyzed by file parsing module 60 in such a way that no code in data object 14 is ever allowed to execute.

step 141: data object 14 is analyzed by a content analysis module which also passively examines data object 14, without executing any of its constituent code. If data object 14 does not pass the decision logic of the content analysis module, it is sent to step 145, below.

step 142: data object 14 is examined for virus signatures. This is done passively, and no code is ever executed, it is merely observed; in this way, any malicious code within data object 14 can never affect the operating system or the core logic of the network security device, and no damage can be wrought. If a virus exists within data object 14, the object is sent to step 145, below.

step 143: data object 14 is examined passively for any other criteria defined by the network security device's administrator, or otherwise built in to the network security device. If the data object fails the examination, the object is sent to step 145, below.

step 144: data object 14 leaves the hard disk and may then be transmitted either via a network or physical link (USB for example) to the user's computer, pending further analysis.

step 145: the data object 14 is analyzed for its characteristics, including the time of its arrival and pertinent data payload information. These are recorded in a buffer, which is searched for patterns among the incoming traffic step 146: notification is sent and the suspicious pattern is logged.

step 147: data object 14 is dumped.

Figure 14:
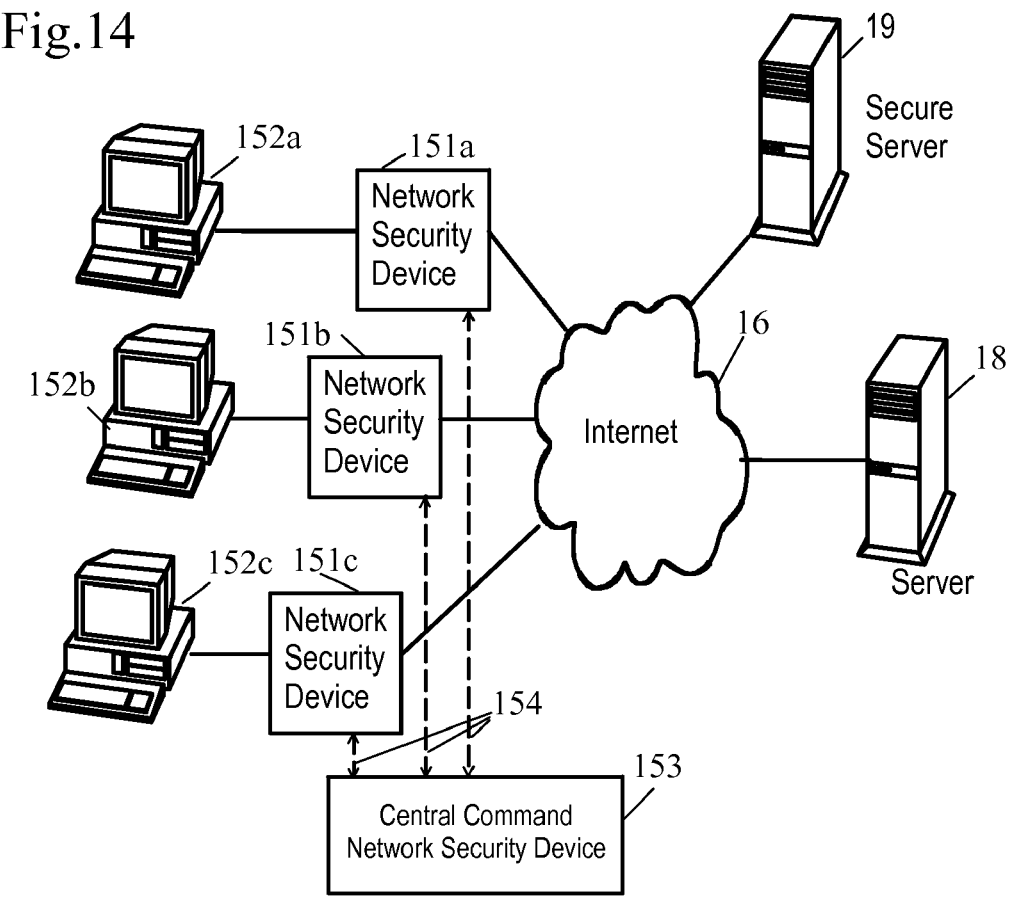
FIG. 14 is a diagram of how a number of the network security devices of the invention can cooperate with a central security device for "sensor grid computing".

Sensor Grid Computing FIG. 14

In a typical network, security devices are placed at carefully selected gateways between subnetworks and key points of interest. Larger networks run into problems when processing-based security devices like IPS and firewall nodes are placed at the main gateway between the local network and the Internet; hardware simply doesn't exist to process the enormous amount of data passing between the Internet, and the often thousands of computers on the local network. For this reason, multiple security devices must be employed, each with carefully crafted rulesets, across the network. The correct placement of these devices is crucial, as a poorly planned network topology can result in broad exploitable holes.

It is the nature of a spread-out security system to operate on partial information. If four subnetworks are protected by four firewalls, with identical rules, theoretically they are protected equally. When hundreds of simultaneous attacks are directed against one of those four subnetworks, and an exploit is discovered, the remaining three firewalls are completely oblivious, and it is the responsibility of the administrator to patch and repair each security device to prevent further exploitation.

On first inspection, the network security device is no different. As a security device it operates on rules and procedures, and acts on Internet traffic in fundamentally the same way as a firewall, except with much greater complexity and power. The network security device is an adaptive machine, however, and through immense information parsing, logging, and behavior examination, the network security device can make recommendations to administrators, or if the need arises, modify its own rules in order to block unforeseen attacks. The immense amount of information that each Network security device deals with, in addition to the adaptability of the device, results in an innovative strategy for network security; Network security devices can act as sensors, and diligently report back to a central server, which might even be another Network security device. Logging is equally comprehensive; immense amounts of raw data, as well as structured and parsed logs can be forwarded from the network security device to external logging servers, offsite archives, or any other destination the administrator chooses. This is illustrated in FIG. 10.

Referring to FIG. 14, there is shown an example of a corporate or other large network is represented, with composite connections between the Internet 16, which may mean the actual Internet or any similar external network, and end-user workstations 152a-152c, which might be single computers or local subnetworks comprised of multiple computers.

Imagine that each of these subnetworks is protected in its connections with servers 18 over the internet 16 with a Network security device 151a-151c. All of the individual network security devices are connected to the internet 16, and through the internet to the secure server 19, as explained above.

Each network security device 151a-151c uses a separate, isolated connection 154 to central command network security device 153 to communicate log information, attack details, notable traffic, or any other security-related information. Updates can also be sent to and from the central command Network security device 153, as well as any other information which may need to be passed between various Network security devices 151a-151c on the local network. The isolated connection 154 may be a physical wire, or a wireless interface, but should in any case be completely separate from the local network or Internet 16 traffic. Network traffic of any kind is unable to travel on the isolated Network security device 153 connection 154; the only allowable traffic is that which is sent between a network's constituent network security devices 151a-151c for purposes of network security control.

Suppose a new form of attack commences on one of the subnetworks, evidenced by suspicious traffic detected by the network security device 151a. The behavior triggers a closer examination, and special care is automatically taken in logging the suspicious traffic and examining it for evidence of malicious activity. Soon after the attack begins, the network security device's 151a logic might determine that action must be taken, and the network security device 151a begins blocking the malicious traffic based on a combination of port and source information, as well as the actual data contained within the payload portion of the traffic packets. This "fingerprint" information allows the network security device to completely thwart the attack, protecting that individual sub-network.

From this point, the network security device 151a that developed the fingerprint automatically uploads it to the central Network security device 153. This central Network security device 153 is not used to monitor traffic itself, it merely oversees the activities of the numerous other "sensor" Network security devices 151a-151c. The central device 153 receives the fingerprint from the single Network security device 151a that was attacked, along with detailed logs and traffic data which can be later examined by administrators. The central Network security device 153 contacts every one of the other Network security devices 151b-151c on the entire network, and transmits the "fingerprint". The result is that each and every Network security device on the network is protected against the previously-unforeseen attack, based on the actions of a single "sensor" Network security device 151a somewhere on the local network.

This would vastly reduce the workload of a network administrator in updating and writing rules for each of the component network security devices; as well, since the network security devices are continually examining information, details of suspicious activity can be logged and sent to the central device. Using this information, an extremely valuable network activity map can be created, detailing which sections of the network are attacked most frequently, and which are considered most vulnerable to future attack.

This unprecedented collaboration between security devices results in an organic, flexible, and automatically-evolving security net. Attacks are met with quick resolution, and improvements can be automatically and quickly rolled out to every corner of the network, while the administrator takes as much or as little involvement in the process as they deem necessary.

Beyond the collaboration, processing could also be distributed in areas of high load; Network security devices connected through a central "command" node could be actively monitored for free system resources, and in situations where a burst of traffic occurs, some of the data processing and decision logic could be instantly and automatically offloaded to idle Network security devices. This would allow even the highest-bandwidth networks to maintain real-time, comprehensive security coverage.

Through heavy customization, it is conceivable that the otherwise-wasted processor cycles of an idle Network security device network could be used to carry out multi-threaded tasks unrelated to network security. For instance, a corporation running 20 Network security devices could devote a percentage of the idle resources to the CAD department, allowing rendering to take place on what is essentially a powerful computing cluster. This load balancing would be seamless and would allow for bursts of network analysis activity, automatically giving priority to network security, but allowing for powerful processing applications in the meantime.

Figure 20:
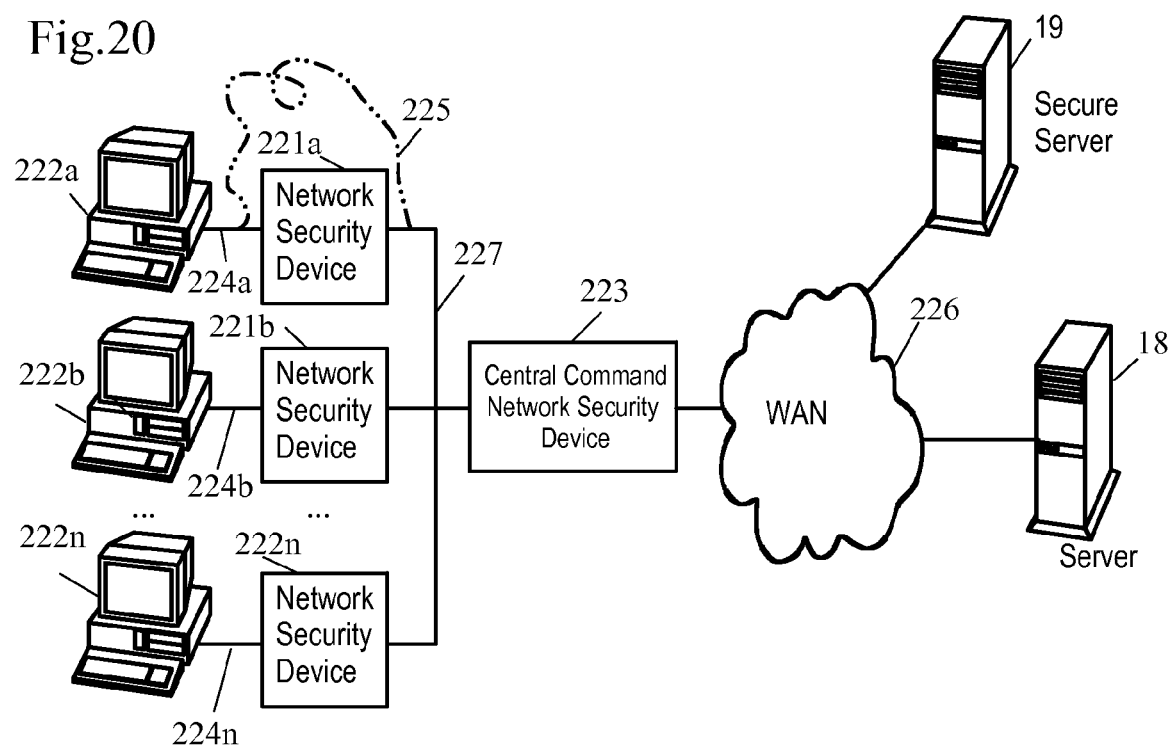
FIG. 20 shows the operation of the network security devices in a LAN-to-WAN screening application.

Using a Network Security Device with
LAN-to-WAN Traffic FIG. 20

FIG. 20 shows how a number of network security devices may be interconnected to protect a local area network (LAN) 227 which is connected to a wide area network (WAN) 226 from unwanted traffic which might be introduced by a deliberate bypass of the security system. Picture a network comprised of "n" computers (222a, 222b, . . . 222n) attached to "n" network security devices (221a, 221b, . . . 221n), with a single 'command' network security device 223 that guards the link between the local network 227 and the wide area network 226.

Conceivably, a single user on the local network 227 could use whatever means necessary 225 to physically bypass the network security device 221a between his computer 222a and the LAN 227 and introduce so-called "insecure" traffic to the network. Since the entire local network 227 is protected by the "command" network security device 223, the insecure traffic would still have to pass through it before reaching the wide area network 226.

In this configuration, then, a security indicator—a simple flag, bit, suffix, or other piece of add-on datum—may be affixed to the traffic traveling BETWEEN network security devices 221a-221n. For example, network security device 222b is sending outbound traffic, so it attaches a checksum verifier or some sort of encryption key to the traffic, and sends it to the "command" network security device 223 for transmission to the wide area network 226. Before transmitting the traffic, the command device 223 performs a verification to make sure the traffic came from a network security device 221a-221n (and not a computer bypassing a network security device), by making sure that the traffic contains the security indicator. If the security indicator is present, the central command network security device 223 passes the traffic to the WAN 226 after stripping the security indicator from the traffic. If the security indicator is not present, the central command network security device may be programmed to notify a secure server 19, or other user(s), or to take other actions such as refusing to accept further traffic from the offending computer 222a. This method could also be combined with the method of sending "decoy" traffic, explained in connection with FIGS. 11a-c.

This relates to the ability of the network security devices to be visible to one another, thus "policing" the network together, while still being invisible for the purposes of network security.

Applications Secure Keying and Encryption

The network security device provides an additional layer of intra-network authentication to prevent traffic spoofing and attempts to obfuscate network information. Depending on the security policies of a local network, the network security device could be set up to 'tag' individual packets of information with a secure 'key' unique to each Network security device. This key would allow various Network security devices to ensure that the traffic originates from a readily identifiable node. In addition to this keying, the network security device has the ability to encrypt traffic on the fly, with either the various Network security devices or the central node device keeping track of the public and private keys necessary to decrypt the traffic. This would prevent outsiders from accessing a wireless network, for example, from just outside the building; even though an intruder may have accessed the network, the traffic isn't keyed or properly encrypted, and is thus killed by any Network security device that encounters it. This specific type of packet mangling is rarely seen in security devices, but is becoming increasingly important as networks become wireless.

Law Enforcement

One of the most powerful applications for the network security device is in providing real time data, which can be employed to catch the attackers, rather than just repelling them. Whereas a firewall might be effective in preventing certain types of attack, the network security device implicitly gathers detailed information about all unauthorized attempts at transferring information out of the network; information which could be readily entered as evidence.

Beyond even this, the potential exists for a collaborative real time investigation, where not only is the attacker deceived into thinking they have obtained sensitive information, but their use of said sensitive information is tracked by the law enforcement agency. This is best illustrated with an example, shown in diagrammatic form in FIGS. 11a to 11c.

Consider a Network security device 121 that has been configured for law enforcement purposes, connected to a user's computer 120 and network 16. Also connected to the network 16 is a malicious server 122, or "attacker".

Figure 11A:
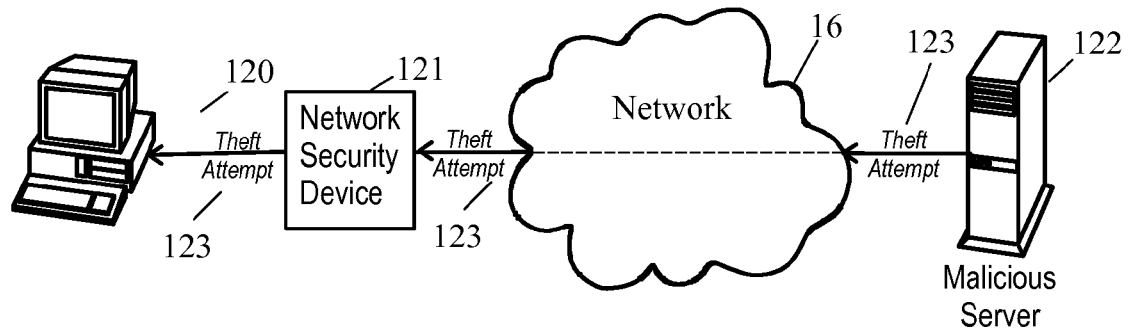
FIGS. 11a to 11c show how the network security device can work with a law enforcement agency and financial institution when a theft attempt is detected.

In FIG. 11a, an attacker 122 comes along and through some means, sends an attempt 123 over network 16 to collect personal information from the user 120. The attempt could be in the nature of infecting the user computer 120 with a worm, or might be a "phishing" attempt or the like. Say, for example, the server 122 sends a message impersonating the user's bank and asks for a user's banking password.

Figure 11B:
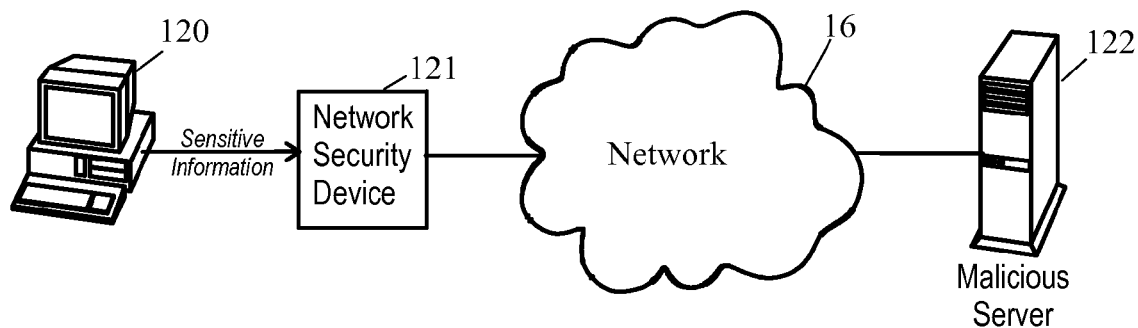

In FIG. 11b, the user submits it willingly, not realizing the nature of the attempt. Normally, what would happen is the network security device 121 would instantly detect that a piece of sensitive information (the bank password) is about to leave across the network 16, and upon realizing that the destination 122 is not a legitimate banking institution, the connection would be dropped. A Network security device 122 configured for law enforcement takes a more creative approach.

Figure 11C:
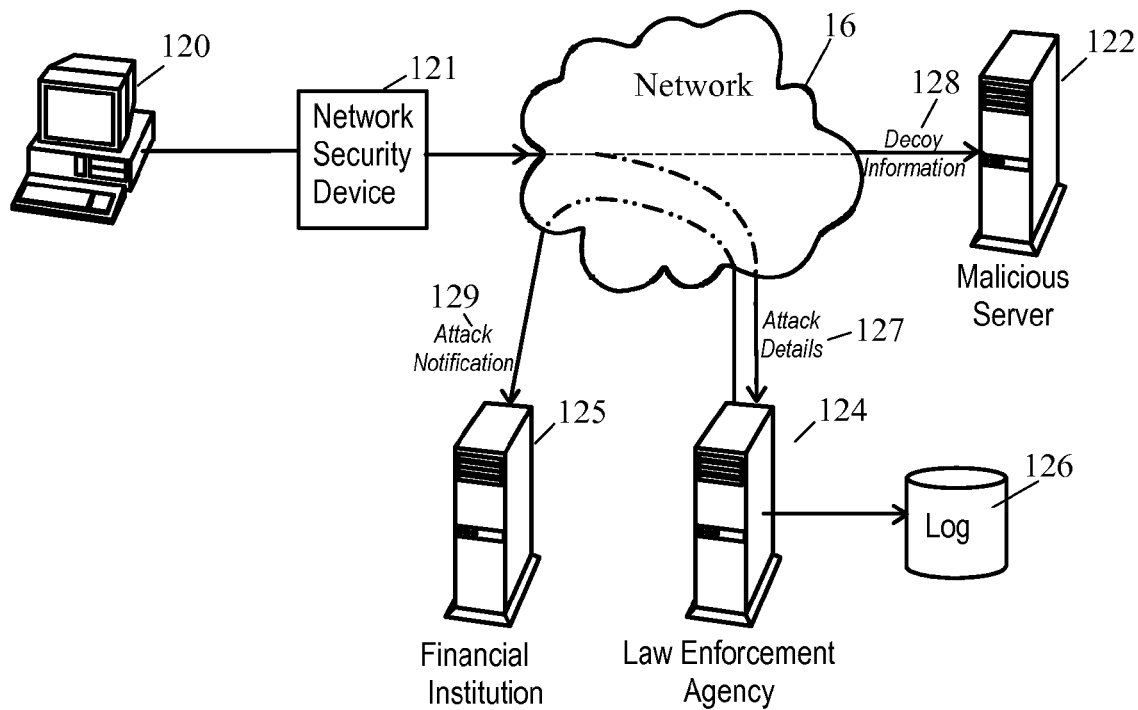

As shown in FIG. 11c, instead of dropping the connection, the network security device 122 could locate the tiny bit of text that contains the user's password, and replace it with a special "decoy" account or password or other information provided by law enforcement agencies. To the attacker, this password looks legitimate, but in actuality law enforcement officials are merely waiting for the attacker to use this "decoy" password, so they can track its movement. Banks and financial institutions instruct their servers to look for these "decoy" passwords or credit card numbers, and alert the authorities when a user attempts to log into an account using the decoy.

In addition to sending the decoy to the attacker 122, the network security device 121 immediately notifies law enforcement agency 124 with a notice of the attack plus any details 127, and legal action may be taken. The details of the attempt can be logged 126 at the law enforcement agency 124, and a notification 129 can also be sent to the financial institution 125, either by the law enforcement agency 124 as shown in FIG. 11c, or directly by the network security device 121 itself, so that the institution can take appropriate steps as well. Other notifications (not shown) can easily be added, to other law enforcement agencies or financial institutions or credit card processing or verification services, etc.

At this point, the malicious entity/user has received decoy information that does not represent any user's actual sensitive information. The malicious entity/user is not aware of this fact, and therefore, in most instances would attempt to make use of this information to commit fraudulent transactions (i.e. withdrawing money from a person's account, buying goods/ services on a credit card). The authentic domain name holder then monitors their respective authentic web sites to determine if any attempts have been made to use the fraudulent information. Through monitoring for use of this decoy information, the authentic holder of the domain name and any respective law enforcement agencies can attempt to track and ultimately prosecute the entities/users who are attempting to use such information.

In this way, attackers can never be certain if the password they've stolen is a legitimate password, or a decoy that will result in their arrest the moment they attempt to use it. Since the network security device is invisible from a network perspective, the attacker has no idea whether a Network security device is being employed against them. The data provided to law enforcement agencies and financial institutions would prove invaluable in curbing the rising trend of electronic theft.

The network security device of the invention can also be programmed with appropriate rules to screen computer traffic for security problems. For example, if a network security device was installed in a library, it could be loaded with rules to monitor information or combinations of information to attempt to determine if a user's activities are somehow suspicious. For example, a user opens plans for a bridge in one window, and plans for a bomb in the other. In this situation, the network security device could be set to alert a law enforcement agency, and suddenly the law enforcement server is "watching" this traffic THROUGH the network security device, and totally invisibly.

Now, if the user accessing the illicit materials decides to email them to another malicious user, the law enforcement agency can see everyone involved, and choose to manipulate the data going in both directions however it sees fit.

Figure 15:
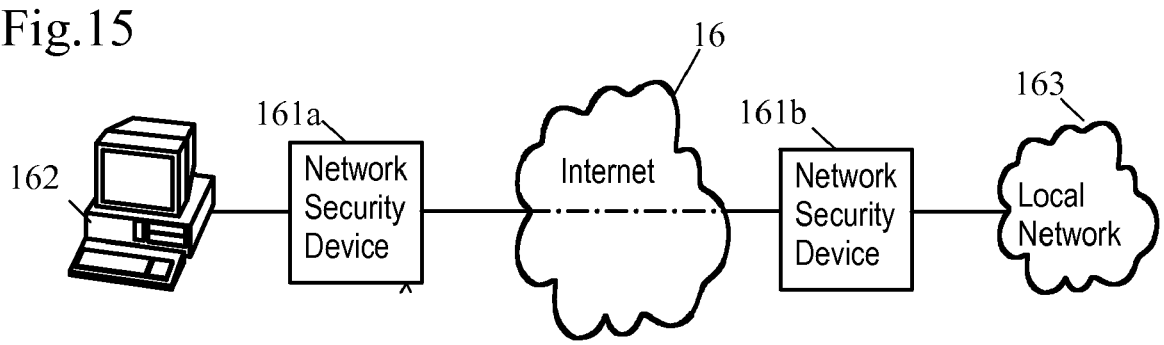
FIG. 15 is a diagram of how the network security device of the invention can be used in a virtual private network (VPN).

Secure VPN Authentication FIG. 15

Closely related to the concept of on-the-fly traffic encryption is the emergence of VPN, or Virtual Private Network security solutions. The idea is that secure transactions and traffic can be sent over insecure lines, by providing an authentication procedure between a local client computer, and an external server computer. Typically this is done when employees of a local network are off-site, and need to tap back into the network to access private resources. The client computer (belonging to the employee) sets up a VPN connection with the external network (the corporate network) and all traffic from then on is encrypted; even though it travels over insecure lines, it is considered a secure method of communication.

The network security device offers a comprehensive package of authentication tools, ranging from simple "Trusted VPN" schemes, where the security is based solely on the integrity of the network and the authentication of the users in question, to complex forms of "Secured VPN", using cryptographic tunneling and randomized key-based authentication. The network security device uses a protected set of routines to generate truly random keys in order to ensure cryptographic integrity, and with the additional authentication routines built into the network security device (such as additional identification codes coordinated with a secure server,) VPN reaches levels of security unprecedented in the current industry. Due to the hardware nature of the network security device, hardwired VPN keys can even be produced, requiring the user to insert a dongle or a memory card into the physical Network security device in order to authenticate a VPN session, to maximize the inherent security.

The network security device is furthermore able to manage multiple VPN connections from multiple computers on the local network, with the option of isolating those computers during a VPN session; in essence, denying all traffic that isn't related to the VPN connection, further reducing the possibility of an intrusion. This, combined with all the other security features automatically carried out by the network security device, results in a cutting-edge VPN solution for modern networks.

Referring to FIG. 15, remote workstation 162 is described as any workstation, desktop, laptop, or mobile computing device used remotely, outside of the local network. A typical case might be an employee connecting through a laptop, using a hotel network connection.

Remote workstation 162 connects to the wide area network 16 (herein represented as the Internet, but could be any insecure wide area network) through Network security device 161a. Network security device 161a carries out all VPN authentication procedures, and on-the-fly encryption, using hardwired cryptographic procedures, which cannot be modified by either the local user or the external wide area network 16.

The VPN connection is therein established between remote network security device 161a and local network security device 161b, which resides at the local network 163, the network to which remote workstation 162 desires to connect. Once authentication is granted, remote workstation 162's traffic is completely encrypted and secured by remote network security device 161a, sent over unsecured wide area network 16, and decrypted by local Network security device 161b, where it is then allowed to enter local area 163.

This VPN connection is subject to the network security device's identification routine, wherein every node along the chain is authenticated, and the user's ISP is correctly identified before traffic is sent, in order to locate any possible malicious servers, or other subversion.

DEFINITIONS

As the terms "PC" and "network", are used herein, a "PC" could be another network/subnet/LAN, etc., and so could a "network".

Behavior Analysis—Security devices which perform behavior analysis not only examine traffic for known malicious activity, but can also recognize previously unknown patterns, and model unusual behavior on a network. Depending on the level of automation afforded to the device, this behavior analysis can lead to anything from a notification to the administrator, to a logging procedure, or even a blacklisting of those nodes involved in said suspicious behavior.

Client—A client is any user, or that user's computer, accessing a service or server computer, or using a piece of software. The client is the "end-user", and is typically referred to in terms of a "client-server" relationship, where the servers exist to provide functionality to the clients. See End-User.

Distributed Computing—Distributed computing takes advantage of the fact that multiple computers or devices are not all operating at full capacity all the time. As such, there are a tremendous number of wasted processor cycles which could be put to better use. Distributed computing takes a normally taxing processing task, and splits it up among different nodes, allowing the unused processor cycles in different computers or devices to "work together" on a single processing task, and coordinate results. This method of computing can produce fantastically powerful "computers" which are actually hundreds of nodes working together. The disadvantage is that many sequential processing tasks achieve no benefit from a distributed approach, and cannot be processed faster using such a computer.

DNS—A DNS (Domain Name Server) is a server that stores various types of information pertaining to Internet domain names. Most notably, the DNS server contains a vast table of domain names and their corresponding 4-part server IP addresses. When a web browser attempts to access an address typed by the user, it first contacts a DNS server to retrieve the address of the corresponding server, and then carries out all further connections with said server.

Electronic Attack—An electronic attack is any attempt to compromise the security (or perceived security) of a private network, server, or client. Disruptions of service, theft of private information, malicious exploitation of bugs within a user's software, and other forms of surreptitious action are considered types of electronic attack.

Encryption—Any of numerous methods of obfuscate the meaning and content of data. Simple encryption includes substitution of alphanumeric characters according to a specific key, while complicated encryption uses a variety of randomized algorithms and key sharing methodologies to render all forms of connection and communication data unreadable.

End-user—The end-user is the most common user of a set of services or applications; the employees within a corporate network, the students within a university network, and the customers of an ISP are all end-users. See Client.

Ethernet—Ethernet is a family of computer networking technologies used to connect numerous client computers in a Local Area Network, or LAN. The term "Ethernet" can be used for various protocols and technologies, but most commonly it is used to define the set of signaling and wiring standards used to define the physical layer of a complete network stack. "Ethernet" is also commonly used as a catchall term for the entire set of protocols and technologies that are most commonly in use on modern networks and the Internet.

Exploit—An exploit is a bug, or errant snippet of poorly written software code, which results in vulnerability in either the software itself, or the overall system. Low-risk exploits can result in a given piece of vulnerable software being jammed or shut down, while high-risk exploits can allow malicious users to arbitrarily run additional programs, or otherwise gain full access to an end-user's system.

Firewall—A firewall can be either hardware or software, and represents a configurable method to control the ports and socket connections available to a client computer, or network. In theory, a firewall only allows specific protocols, ports, and types of communication to be initiated between a client and a third party. Without a firewall, these connections are unregulated, and the client is vulnerable to numerous forms of port-based attacks.

Hacking—Hacking is a generic term typically applied to manipulating devices or technologies in ways that the designers did not necessarily foresee. The term "hacking" has been generally used by the media to describe electronic attacks, a misnomer that casts innocent and innocuous hackers in a negative light.

Hardware—The term "hardware" describes the physical elements of a computer or network. Routers, video cards, hard drives, and other such devices are all described as "hardware", and interact either autonomously, or with an operating system using special pieces of software called "drivers", which carry instructions on how to operate the functions of the hardware.

IDS (Intrusion Detection System)—An Intrusion Detection System is a set of hardware and software which actively and comprehensively monitors the network traffic passing in and out of a given network, or client computer. The IDS is designed with numerous sensors that specifically watch the network for any malicious or otherwise damaging activity, and extensively log any such activity. An IDS is typically employed in a network to quickly consolidate and simplify vast amounts of network traffic, and provide the perspective an administrator needs to take action. The network security device employs a full-featured IDS to monitor and log all aspects of a computer network in real time. See IPS (Intrusion Prevention System)

Information Theft—Information theft is a process in which a malicious attacker compromises and gains access to a computer, and views or downloads sensitive information that the client would deem private. Information theft can also occur without actually breaking in to the computer system; simply watching traffic as it passes through a network, or breaking the encryption on such traffic, can result in sensitive information being stolen.

Internet—The Internet is a vast, global set of networks and computer systems using a common set of technologies and protocols to share data and information.

IPS (Intrusion Prevention System)—An Intrusion Prevention System is a system of hardware and software that monitors a network or computer for attacks, intrusions, or malicious actions and halts them before significant damage can be wrought. An IPS is more complex than the related IDS, as it must not only monitor and log network data, but use these data to make crucial decisions to preserve the security of the network or computer the IPS is protecting. The network security device incorporates a very complex form of IPS. See IDS (Intrusion Detection System).

Network—A network is a set of client computers and servers that connect to each other using a common set of technologies and protocols, most commonly Ethernet. A network can be as small as two computers, or as large as the entire Internet.

Network Stack—A network stack is a term describing the multiple "layers" of protocols and technologies that define the methods computers use to communicate and connect to one another. A common network stack, used to connect the majority of the Internet, is composed of an Ethernet layer (the lowest layer), overlaid by an IP layer, which is in turn overlaid by a TCP layer. This particular network stack is commonly referred to as TCP/IP.

Packet—The packet is the base unit of Internet and Network traffic. All data on a network travels in the form of numerous discrete packets, which are formed according to the various standards and protocols that comprise networking. When data are sent from one computer to another, these data are split into multiple packets by the networking software and hardware, sent over the physical network connection, and reassembled by the destination computer to form a complete copy of the original data.

Pharming—Pharming is the act of secretly redirecting a client to a malicious website, or misrepresenting the legitimacy of a website by matching an incorrect (malicious) server address to an otherwise legitimate domain name. This is typically done by modifying the HOSTS file on a user's system, but can also be accomplished by "poisoning" the DNS server that the user connects to. The effectiveness of this attack is due to the fact that according to the browser address bar, the user is at the correct website, and there is often no reason to suspect any suspicious activity.

Phishing—Phishing is a confidence scam designed to convince the user to provide sensitive information to a malicious website, acting under the guise of a legitimate website. Phishing attacks use subtle differences in the spelling of a domain name, cross-site scripting, or other methods of deception, coupled with a "cover story" to convince the user of the need to divulge personal information, usually a username and password, or credit card number. Upon visiting the website mentioned in the phishing cover story, the user assumes the website is legitimate, when in actuality any information entered is sent to the originator of the phishing scam.

Physical interface is taken to mean a data communication/input device physically separate from network path—could be a dedicated keyboard or keypad, or a USB/serial/parallel interface, or a memory card or Read-only-Memory (ROM).

Poisoned DNS—A poisoned DNS is a third-party DNS nameserver, typically maintained by the ISP, which has been compromised and manipulated. The DNS server contains tables of domain names coupled with server addresses, and a poisoned DNS typically contains false entries in the table, so as to match a malicious server to a legitimate domain name. Users accessing a poisoned DNS will see a legitimate website address in their browser address bar, but will actually be connected to any server the attacker has chosen. This malicious server is typically designed to mimic the legitimate website, to allay suspicion.

Proxy Server—A proxy server is a computer running some form of redirection software. Legitimate proxy servers are used for various reasons, often to provide anonymity to the users connecting through the proxy server. Users connect to the server, and all traffic is routed through the proxy server, hiding the original source of the Internet traffic. Proxy servers can be secretly installed on client computers without the user's knowledge, via Trojan-Proxy viruses.

Rootkit—A rootkit is a virus, or set of modified tools, which prevent the operating system from "seeing" or modifying certain files or pieces of code. They do this by manipulating fundamental elements of the operating system, essentially blinding the operating system to certain files, often viruses, which are then impossible to detect or remove using traditional means (virus scanners, for instance.) Methods of detecting rootkits are in their infancy, and include comparing data streams, and other types of low-level passive scanning.

Router—A router is a computer or network device that splits a single network connection into multiple pathways. Various computers or sub networks attach to the router, which enables them to all use a common connection, and the router directs the various bits of traffic to and from the correct computers.

Server—A server is any computer, connected to a network or the Internet, which provides an accessible service to connected client computers. Servers can be public or private, and typical servers provide services including website hosting, file storage, and domain name resolution.

Socket—A "socket" is any connection between two ports on two connected computers. For example, a client computer using the outgoing port 2531 to connect to a server's incoming port 80, has an "open socket" between port 2531 and 80.

Software—Software is any set of non-physical code and instructions that define the actions of computer hardware. Historically, security vulnerabilities have been a result of poor software design much more often than poor hardware design. Neither side is perfect, however.

Spam—Spam is a slang term for unsolicited advertising in the form of email. Spam can inflict damage on networks and computers, as it can be responsible for enormous amounts of computer resources and network bandwidth.

TCP/IP—TCP/IP refers to TCP packets being created and transmitted according to IP, or Internet Protocol. TCP/IP is a set of standards that defines the vast majority of network and Internet traffic. The term TCP/IP is commonly used as a blanket expression to describe the entire network stack.

Trojan—A Trojan, or "Trojan horse" is a malicious set of code that enters a user's computer under the guise of being a harmless program. Trojan viruses can be pieces of code inserted into otherwise legitimate software, or can be stand-alone applications that are transmitted and executed under the assumption that they perform a useful, or otherwise harmless task. Trojans can be designed to run arbitrary code on a user's system once installed, and can be used to set up hidden proxy servers.

Virus—Strictly, a computer virus is any self-replicating piece of computer software that spreads and infects other computers by copying segments of its code into documents and other legitimate files. More loosely, the term is applied to any malicious file or snippet of code which spreads, through self-replication or otherwise, to numerous computers or networks. Viruses can delete files, compromise the security of a system, and produce enormous amounts of malicious network traffic.

Virus Scanner—A virus scanner is a piece of software designed to examine files for known viruses, according to a set of signature files provided by the company maintaining the scanner. New viruses must be quickly analyzed by the company, and signature file updates be distributed to the end users for the virus scanner to be effective. With new viruses there is inevitably a lag-time between the creation of a new virus, and the availability of signature files to detect and remove it.

VPN—VPN ("Virtual Private Network") is a specific type of private communication network maintained by corporations, or between corporations, to send private data over a public network. VPN data travels over insecure lines, including the Internet, using standard protocols and technologies. The protection is in the form of advanced user authentication on both ends of the connection, and key-based cryptographic encryption applied to the packets of information being sent.

Worm—Strictly, a worm is a type of computer virus that self-replicates and infects other computers, often by injecting pieces of malicious code into legitimate files. Unlike the strict definition of "computer virus", a worm can exist as a stand-alone program and propagate entirely by itself.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A method of screening data objects flowing between a network and at least one communication device using a network security device comprising a data object memory; at least one communication device port coupled to the data object memory; a network communication port coupled to the data object memory; a processor coupled to the data object memory; a permanent memory store for storage of rules, coupled to the processor; a dynamic memory store coupled to the processor; a physical interface coupled to the processor; and a plurality of rules stored in the permanent memory store; the method comprising:

a) receiving a data object at a communication device port or at the network communication port, the network security device being invisible to any communication device and the network;

b) storing the data object into the data object memory;

c) processing the data object in accordance with the plurality of rules stored in the permanent memory store, determining if the data object is in violation of at least one of the plurality of rules, without executing any code in the data object such that the operation of the device is incorruptible by the data objects being processed; and d) if the data object is not in violation of at least one of the plurality of rules, transmitting the data object by the network communication port if the data object was received from a communication device port or transmitting the data object by a communication device port if the data object was received from the network communication port.

2. The method of claim 1, in which the network security device further comprises a device identification, the method further comprising the steps of identifying the network security device to a secure server through the network, and establishing secure communication with the secure server through the network.

3. The method of claim 2, in which the step of processing the data object comprises performing a DNS lookup to retrieve a first IP address associated with a destination address of the data object, performing a DNS lookup using the secure server to retrieve a second IP address associated with the destination address of the data object, and comparing the first IP address to the second IP address, and in step d the data object is determined to be in violation of a rule if the if the first IP address does not match the second IP address.

4. The method of claim 3, further comprising the step of informing the secure server if the first IP address does not match the second IP address.

5. The method of claim 2, further comprising the steps of communicating with the secure server if a data object is determined to be in violation of a rule, receiving at least one item of information from the secure server, and determining the data object to be in violation of a rule based on the at least one item of information received from the secure server.

6. The method of claim 2, further comprising the steps of communicating with the secure server, receiving at least one item of information from the secure server, and stopping all transmission of data objects based on the at least one item of information received from the secure server.

7. The method of claim 1, further comprising the step of alerting a third party if a data object is determined to be in violation of a rule stored in the permanent memory store.

8. The method of claim 7, in which the third party comprises at least one network security device.

9. The method of claim 8, in which the step of alerting a third party comprises sending at least one rule to the other network security device comprising the third party.

10. The method of claim 1, further comprising the step, after the step of storing the data object, of determining if the data object comprises a plurality of files in simple file formats, and if the data object is determined to comprise a plurality of files in simple file formats, parsing the data object to extract the plurality of files in simple file formats, and in which step c of processing the data object comprises processing each of the plurality of files in simple formats separately.

11. The method of claim 10, in which, if the data object cannot be parsed, the method further comprises the step of logging the data object.

12. The method of claim 11, further comprising the step of transmitting the logged data object to a secure server.

13. The method of claim 1, in which the rules in the permanent memory store comprise a URL database comprising a plurality of network addresses, and the step of processing the data object further comprises comparing a destination address of the data object to the addresses in the URL database.

14. The method of claim 13, in which a plurality of the network addresses in the URL database comprise a whitelist, and in step d the data object is determined to be in violation of a rule unless the destination address of the data object matches one of the network addresses on the whitelist.

15. The method of claim 13, in which a plurality of the network addresses in the URL database comprise a blacklist, and in step d the data object is determined to be in violation of a rule if the destination address of the data object matches one of the network addresses on the blacklist.

16. The method of claim 1, in which the plurality of rules in the permanent memory store comprise a sensitive information database comprising at least one item of information, and the step of processing the data object comprises comparing a body of the data object to the at least one item of information in the sensitive information database.

17. The method of claim 16, in which in step d the data object is determined to be in violation of a rule if at least part of the body of the data object matches at least one item of information in the sensitive information database.

18. The method of claim 16, in which the at least one item of information in the sensitive information database is selected from a group consisting of social security numbers, credit card numbers, bank account numbers, brokerage account numbers, specific passwords, and brokerage codes.

19. The method of claim 1, further comprising the step of assembling a data object in the data object memory from a plurality of packets before the step of processing the data object.

20. The method of claim 1, in which the plurality of rules in the permanent memory store comprise a URL database comprising a plurality of network addresses and a sensitive information database comprising at least one item of information, and the step of processing comprises comparing a destination address of the data object to the plurality of addresses in the URL database and comparing a body of the data object to the at least one item of information in the sensitive information database, and in step d the data object is determined to be in violation of a rule if at least part of the body of the data object matches at least one item of information in the sensitive information database and the destination address of the data object does not match one of the plurality of network addresses in the URL database.

21. The method of claim 1, in which the step of processing the data object comprises detecting malware present in the data object, and in step d the data object is determined to be in violation of a rule if malware is detected in the object.

22. The method of claim 1, in which step d further comprises the step of substituting decoy data for at least part of the data object before transmitting the data object.

23. The method of claim 1, in which the plurality of rules comprise a plurality of patterns, and in step d the data object is determined to be in violation of a rule if at least part of the body of the data object match at least one of the plurality of patterns.

24. The method of claim 1, further comprising the step of stopping all transmission of data objects if a data object is determined to be in violation of a rule in the permanent memory store.

25. The method of claim 1, in which the step of processing the data object comprises scanning the data object for metadata indicating that the data object comprises data subject to copyright, and if metadata indicating that the data object comprises data subject to copyright is found, determining if a user of the data object is authorized to use or view the data subject to copyright, and in step d the data object is determined to be in violation of a rule if a the user of the data object is not authorized to use or view the data subject to copyright.

26. The method of claim 1, in which the method only accepts data objects in step a from specified communication devices or networks.

27. The method of claim 1, in which the data object is a request for a website, and the step of processing the data object comprises the steps of:
   retrieving an image of the website;
   retrieving identifying information about the website;
   combining the image of the website and the identifying information about the website into a site fingerprint;
   retrieving a cached fingerprint for the website;
   comparing the site fingerprint to the cached fingerprint for the website; and
   in step d the data object is determined to be in violation of a rule if the site fingerprint does not match the cached fingerprint for the website.

28. The method of claim 27, in which the step of retrieving the cached fingerprint for the website comprises retrieving the cached fingerprint for the website from a secure server.

29. A network security device for screening data objects flowing between a network and at least one communication device, comprising:
   a) a data object memory;
   b) at least one communication device port coupled to the data object memory;
   c) a network communication port coupled to the data object memory;
   d) a processor coupled to the data object memory;
   e) a permanent memory store for storage of rules, coupled to the processor;
   f) a dynamic memory store coupled to the processor;
   g) a physical interface coupled to the processor;
   h) a plurality of rules stored in the permanent memory store;
      the processor being programmed such that a data object received at one of the at least one communication device port or at the network communication port is stored into the data object memory and processed by the processor in accordance with the rules from the permanent memory store, determining if the data object is in violation of at least one of the plurality of rules, and if the data object is not in violation of a rule, the data object is transmitted by the network communication port if the data object was received at the at least one communication device port, and the data object is transmitted by at least one communication device port if the data object was received at the network communication port;
      the device being configured such that the rules are not affected by the processing of data objects in the data object memory;
      the processor being programmed such that a data object in the data object memory is not permitted to interact with the dynamic memory store or the permanent memory store, such that the device is incorruptible by the data objects being processed; and in receiving, processing and transmitting the data objects, the network security device is not visible to the network or the at least one communication device.

30. The network security device of claim 29, in which the network security device further comprises a device identification, such that the device can be identified to a secure server communicating through the network communication port, and the processor is programmed such that the network security device can establish secure communication with the secure server through the network communication port.

31. The network security device of claim 30, in which at least one of the rules causes the data object in the data object memory to be processed to perform a DNS lookup to retrieve a first IP address associated with a destination address of the data object, and also to do a DNS lookup using the secure server to retrieve a second IP address associated with the destination address of the data object, and the rule causes the processor to compare the first IP address to the second IP address, and the data object is transmitted only if the first IP address matches the second IP address.

32. The network security device of claim 31, in which the rule further causes the network security device to inform the secure server if the first IP address does not match the second IP address.

33. The network security device of claim 30, in which the processor is programmed to accept changes to the rules in the permanent memory store from the secure server.

34. The network security device of claim 29, in which the rules in the permanent memory store comprise a URL database comprising a plurality of network addresses, and at least one of the rules causes the data object in the data object memory to be processed to compare a destination address of the data object to the network addresses in the URL database.

35. The network security device of claim 34, in which a plurality of the network addresses in the URL database comprise a whitelist, and at least one rule prevents transmission of a data object unless the destination address of the data object matches one of the network addresses on the whitelist.

36. The network security device of claim 34, in which a plurality of the network addresses in the URL database comprise a blacklist, and at least one rule prevents transmission of a data object if the destination address of the data object matches one of the network addresses on the blacklist.

37. The network security device of claim 1, in which the rules in the permanent memory store comprise a sensitive information database comprising at least one item of information, and at least one of the rules causes the data object in the data object memory to be processed to compare a body of the data object to the information in the sensitive information database.

38. The network security device of claim 37, in which at least one rule prevents transmission of a data object if at least part of the body of the data object matches an item of information in the sensitive information database.

39. The network security device of claim 37, in which the items of information in the sensitive information database are selected from a group consisting of social security numbers, credit card numbers, bank account numbers, brokerage account numbers, specific passwords, and brokerage codes.

40. The network security device of claim 29, further comprising a physical input device for coupling with the physical interface of the network security device.

41. The network security device of claim 40, in which the processor is programmed to accept changes to the rules in the permanent memory store from the physical input device coupled to the physical interface.

42. The network security device of claim 1, further comprising a keypad.

43. The network security device of claim 42, in which the processor is programmed to accept changes to the rules in the permanent memory store from the keypad.

44. The network security device of claim 29, in which the processor is programmed to assemble a data object in the data object memory from a plurality of packets before processing the data object.

45. The network security device of claim 29, in which the permanent memory store is read-only memory.

46. The network security device of claim 29, in which the rules in the permanent memory store comprise a URL database comprising a plurality of network addresses and a sensitive information database comprising at least one item of information, and at least one of the rules causes the data object in the data object memory to be processed to compare a destination address of the data object to the network addresses in the URL database and causes the data object in the data object memory to be processed to compare a body of the data object to the information in the sensitive information database, and at least one rule prevents transmission of the data object if at least part of the body of the data object matches an item of information in the sensitive information database unless the destination address of the data object matches one of the network addresses in the URL database.

47. The network security device of claim 29, further comprising a display.

48. The network security device of claim 29, further comprising a tamper lock.

49. The network security device of claim 29, in which the permanent memory store is encrypted.

50. The network security device of claim 29, in which the dynamic memory store and the data object memory are separate memories.

51. The network security device of claim 29, in which the permanent memory store and the data object memory are separate memories.

52. The network security device of claim 29, in which the permanent memory store is a write-protected partition of memory.

53. The network security device of claim 29, in which the rules in the permanent memory store can only be changed at a determined time.

54. A method of monitoring data objects flowing between a network and at least one communication device using a network security device comprising a data object memory; at least one communication device port coupled to the data object memory; a network communication port coupled to the data object memory; a processor coupled to the data object memory; a permanent memory store for storage of rules, coupled to the processor; a dynamic memory store coupled to the processor; a physical interface coupled to the processor; and a plurality of rules stored in the permanent memory store; the method comprising:

a) receiving a data object at a communication device port or at the network communication port, the network security device being invisible to any communication device and the network;

b) storing the data object into the data object memory;

c) processing the data object in accordance with the plurality of rules stored in the permanent memory store, determining if the data object is in violation of at least one of the plurality of rules, without executing any code in the data object such that the operation of the device is incorruptible by the data objects being processed;

d) copying the data object;

e) transmitting the data object by the network communication port if the data object was received from a communication device port or transmitting the data object by a communication device port if the data object was received from the network communication port; and f) storing the copied data object from step d in a database.

55. The method of claim 54, further comprising the step of stamping identifying indicia on the copied data object.

56. The method of claim 55, in which the identifying indicia comprise date and time.

57. The method of claim 54, further comprising the step of alerting a third party if a data object is determined to be in violation of at least one rule stored in the permanent memory store.

58. The method of claim 57, further comprising the step of substituting decoy data for at least part of the data object before transmitting the data object in step e.

59. The method of claim 57, in which the third party comprises at least one network security device.

60. The method of claim 59, in which the step of alerting the third party comprises sending at least one rule to one of the at least one other network security device.

61. The method of claim 54, further comprising the step of transmitting the copied data object to an offsite logging server.

62. The method of claim 54, further comprising the step of assembling a data object in the data object memory from a plurality of packets before the step of processing the data object.

63. The method of claim 54, in which the plurality of rules in the permanent memory store comprise a URL database comprising a plurality of network addresses, the method further comprises the step, before step b, of comparing a destination address of the data object to the plurality of network addresses in the URL database, and steps d and f of copying the data object and storing the copied data object in a database are performed only if the destination address of the data object matches at least one address in the URL database.

64. The method of claim 54, in which the plurality of rules in the permanent memory store comprise a URL database comprising a plurality of network addresses, the method further comprises the step, before step b, of comparing a source address of the data object to the plurality of network addresses in the URL database, and steps d and f of copying the data object and storing the copied data object in a database are performed only if the source address of the data object matches at least one address in the URL database.

65. A system for network security comprising:

a secure server connected to a network; and a plurality of network security devices for screening data objects flowing between a network and at least one communication device, each network security device comprising:

a) a data object memory;

b) at least one communication device port coupled to the data object memory;

c) a network communication port coupled to the data object memory;

d) a processor coupled to the data object memory;

e) a permanent memory store for storage of rules, coupled to the processor;

f) a dynamic memory store coupled to the processor;

g) a physical interface coupled to the processor;

h) a plurality of rules stored in the permanent memory store;

i) a device identification, such that the device can be identified to a secure server communicating through the network communication port, and the processor is programmed such that the network security device can establish secure communication with the secure server through the network communication port;

the processor being programmed such that a data object received at one of the at least one communication device port or at the network communication port is stored into the data object memory and processed by the processor in accordance with the rules from the permanent memory store, determining if the data object is in violation of at least one of the plurality of rules, and if the data object is not in violation of a rule, the data object is transmitted by the network communication port if the data object was received at the at least one communication device port, and the data object is transmitted by at least one communication device port if the data object was received at the network communication port;

the device being configured such that the rules are not affected by the processing of data objects in the data object memory;

the processor being programmed such that a data object in the data object memory is not permitted to interact with the dynamic memory store or the permanent memory store, such that the operation of the network security device is incorruptible by the data objects being processed; and in receiving, processing and transmitting the data objects, the network security device is not visible to the network or the at least one communication device.

66. The network security device of claim 65, in which at least one of the rules causes the data object in the data object memory to be processed to perform a DNS lookup to retrieve a first IP address associated with a destination address of the data object, and also to do a DNS lookup using the secure server to retrieve a second IP address associated with the destination address of the data object, and the rule causes the processor to compare the first IP address to the second IP address, and the data object is transmitted only if the first IP address matches the second IP address.

67. The network security device of claim 66, in which the rule further causes the network security device to inform the secure server if the first IP address does not match the second IP address.

68. The network security device of claim 65, in which the processor is programmed to accept changes to the rules in the permanent memory store from the secure server.

* * * * *